United States Patent
Yokota et al.

(10) Patent No.: US 10,857,674 B2
(45) Date of Patent: Dec. 8, 2020

(54) ROBOT SYSTEM AND ROBOT

(71) Applicant: Seiko Epson Corporation, Tokyo (JP)

(72) Inventors: Masato Yokota, Azumino (JP); Shiguma Iijima, Suwa (JP)

(73) Assignee: Seiko Epson Corporation

( * ) Notice: Subject to any disclaimer, the term of this patent is extended or adjusted under 35 U.S.C. 154(b) by 252 days.

(21) Appl. No.: 15/568,654

(22) PCT Filed: Apr. 14, 2016

(86) PCT No.: PCT/JP2016/002035
§ 371 (c)(1),
(2) Date: Oct. 23, 2017

(87) PCT Pub. No.: WO2016/174841
PCT Pub. Date: Nov. 3, 2016

(65) Prior Publication Data
US 2018/0154522 A1  Jun. 7, 2018

(30) Foreign Application Priority Data

Apr. 28, 2015  (JP) .................. 2015-091215
Apr. 28, 2015  (JP) .................. 2015-091216
Apr. 28, 2015  (JP) .................. 2015-091217

(51) Int. Cl.
*B25J 9/16* (2006.01)
*B25J 21/00* (2006.01)
(Continued)

(52) U.S. Cl.
CPC ............ *B25J 9/1682* (2013.01); *B23P 19/04* (2013.01); *B23P 21/00* (2013.01); *B25J 9/0018* (2013.01);
(Continued)

(58) Field of Classification Search
CPC ............ B25J 21/00; B65G 2203/0225; B65G 2203/0233
See application file for complete search history.

(56) References Cited

U.S. PATENT DOCUMENTS 4,416,042 A * 11/1983 Hinson ................. B23C 1/20
  29/239
5,459,918 A * 10/1995 Uchida ................. B23P 19/04
  29/434
(Continued)

FOREIGN PATENT DOCUMENTS

CN    101734487 A    6/2010
CN    202063551 U    12/2011
(Continued)

OTHER PUBLICATIONS

Extended European Search Report for Patent Application No. EP16786121.0 dated Nov. 12, 2018 (8 pages).

*Primary Examiner* — Michael S Lowe
(74) *Attorney, Agent, or Firm* — Harness, Dickey & Pierce, P.L.C.

(57) ABSTRACT

A robot system and a robot are capable of easily defining a position of a target object with respect to a robot. The robot system includes a first robot, a first cell which is provided with the first robot and is capable of moving, and a positioning unit which is provided in an inner portion of the first cell and positions a target object.

19 Claims, 20 Drawing Sheets

(51) Int. Cl.
*B23P 21/00* (2006.01)
*B23P 19/04* (2006.01)
*B25J 9/00* (2006.01)

(52) U.S. Cl.
CPC ........... *B25J 9/0084* (2013.01); *B25J 9/0093* (2013.01); *B25J 21/00* (2013.01)

(56) References Cited

U.S. PATENT DOCUMENTS

| | | | | |
|---|---|---|---|---|
| 5,468,334 | A * | 11/1995 | Searle | B23K 20/1205 |
| | | | | 156/580 |
| 6,008,636 | A * | 12/1999 | Miller | G01R 31/01 |
| | | | | 324/757.01 |
| 7,325,667 | B1 * | 2/2008 | Damick | B25J 5/04 |
| | | | | 198/395 |
| 7,736,120 | B2 * | 6/2010 | Pierson | B65G 57/24 |
| | | | | 198/430 |
| 8,327,531 | B2 | 12/2012 | Ono et al. | |
| 8,590,688 | B2 * | 11/2013 | Weigl | B65D 85/48 |
| | | | | 198/346.1 |
| 8,720,046 | B2 | 5/2014 | Ono et al. | |
| 9,132,554 | B2 | 9/2015 | Kouno et al. | |
| 9,248,533 | B2 | 2/2016 | Ono et al. | |
| 2002/0040840 | A1 * | 4/2002 | Becherucci | B65G 17/002 |
| | | | | 198/345.3 |
| 2003/0221504 | A1 | 12/2003 | Stoianovici et al. | |
| 2008/0222883 | A1 | 9/2008 | Ono et al. | |
| 2008/0235970 | A1 * | 10/2008 | Crampton | B25J 13/088 |
| | | | | 33/503 |
| 2010/0125361 | A1 | 5/2010 | Mougin et al. | |
| 2010/0323600 | A1 * | 12/2010 | Tanaka | B08B 15/02 |
| | | | | 454/66 |
| 2011/0258847 | A1 | 10/2011 | Meisho et al. | |
| 2012/0232698 | A1 | 9/2012 | Koga et al. | |
| 2012/0285007 | A1 | 11/2012 | Ono et al. | |
| 2013/0086801 | A1 * | 4/2013 | Mimura | B23P 21/00 |
| | | | | 29/720 |
| 2014/0046471 | A1 * | 2/2014 | Bamford | G05B 19/048 |
| | | | | 700/110 |
| 2014/0277713 | A1 | 9/2014 | Kouno et al. | |
| 2014/0277733 | A1 | 9/2014 | Kouno et al. | |
| 2014/0310955 | A1 | 10/2014 | Ono et al. | |

FOREIGN PATENT DOCUMENTS

| | | |
|---|---|---|
| CN | 202880420 U | 4/2013 |
| CN | 104044133 A | 9/2014 |
| CN | 204093669 U | 1/2015 |
| EP | 0681887 A2 | 11/1995 |
| EP | 2952298 A2 | 12/2015 |
| JP | 62-124890 | 6/1987 |
| JP | 06-262446 | 9/1994 |
| JP | 2008-213129 A | 9/2008 |
| JP | 2009-172689 A | 8/2009 |
| JP | 2010-110038 A | 5/2010 |
| JP | 2010-137321 A | 6/2010 |
| JP | 2012-187663 A | 10/2012 |
| JP | 2014-176937 A | 9/2014 |
| WO | WO-2014-115244 A1 | 7/2014 |
| WO | WO-2014-157189 A1 | 10/2014 |

* cited by examiner

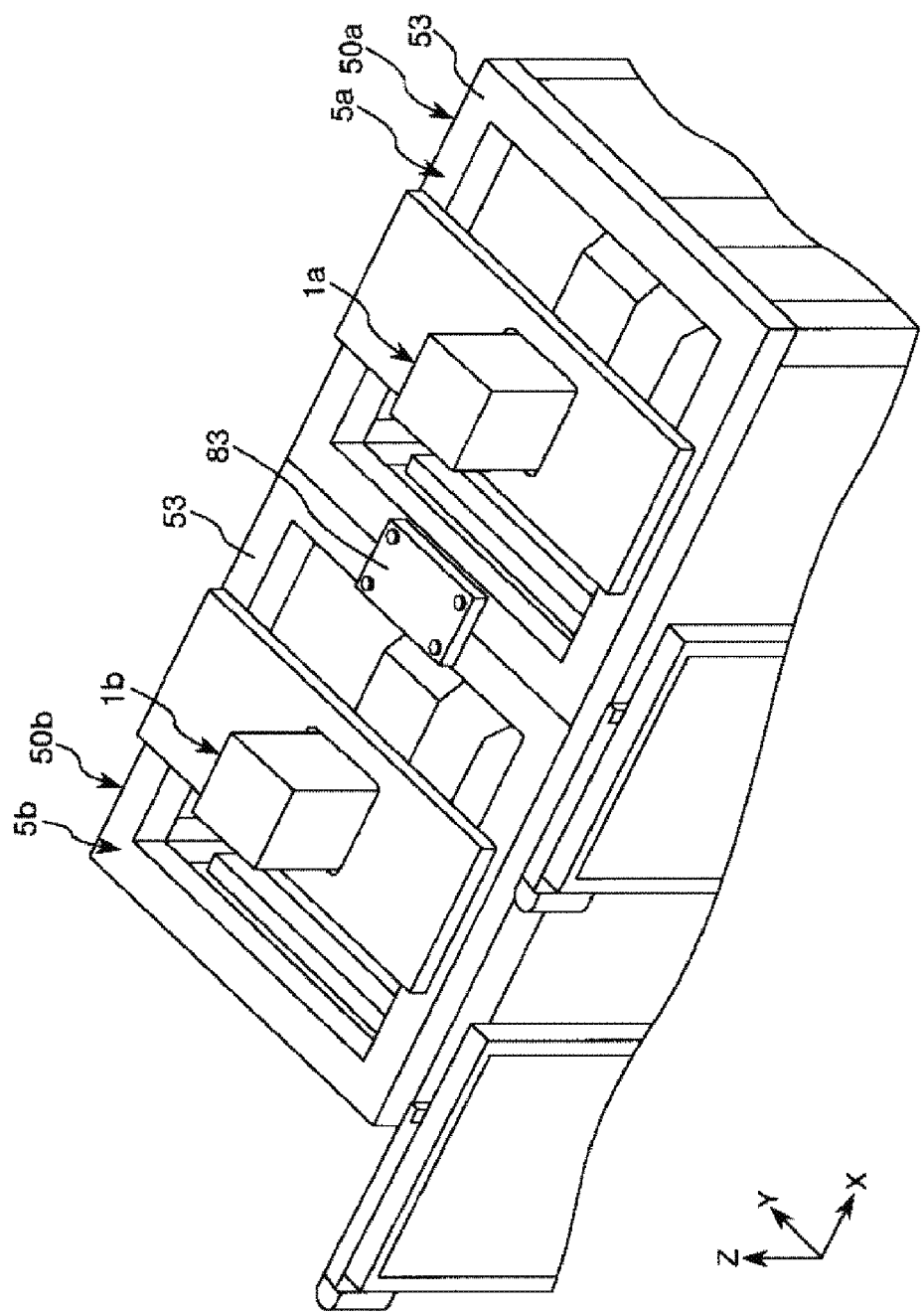

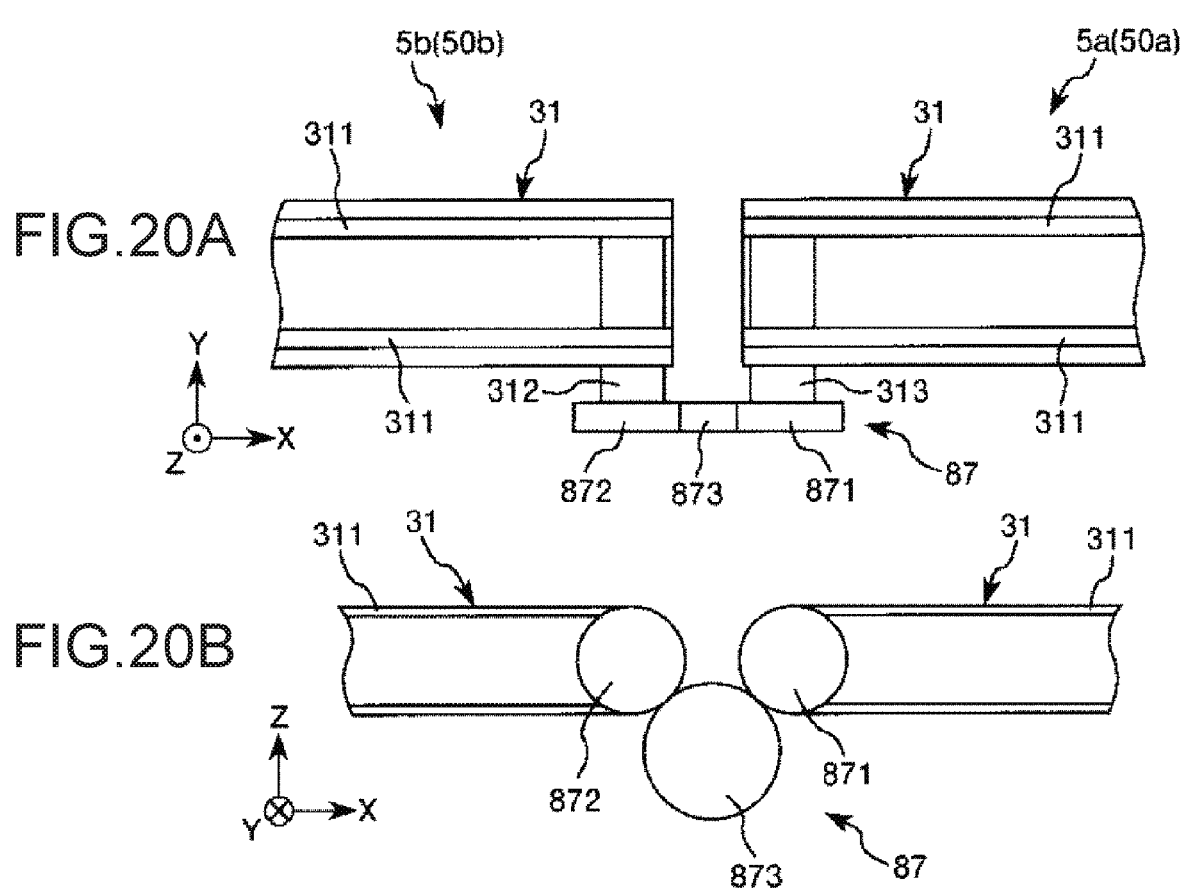

ROBOT SYSTEM AND ROBOT

BACKGROUND

Technical Field

The present invention relates to a robot system and a robot.

Background Art

In the related art, a robot system including a robot which is provided with a robot arm, and a cell which supports the robot is known. In the robot arm with which the robot is provided, a plurality of arms (arm members) are connected with each other via joint portions, and, for example, a hand is attached as an end effector to the arm of the most distal end side (the most downstream side). The joint portions are driven by motors and the arms move rotationally through the driving of the joint portions. The robot grips a target object using the hand, for example, moves the target object to a predetermined place and performs work such as assembly.

As an example of such a robot system, JP-A-2012-187663 discloses a robot system (a production device) including a robot having two robot arms and a cell which supports the robot.

For example, in a case in which such a robot system is attached to an external device which is external to a cell such as a belt conveyor and the robot is caused to perform work on a work (a target object) which is mounted on the external device, a positioning unit which defines the position of the work with respect to the robot is always provided on the external device.

JP-A-2010-137321 discloses a robot (a moving robot) having a revolving table and an arm which is connected to the revolving table. The robot which is disclosed in JP-A-2010-137321 is provided on a ceiling frame.

JP-A-2010-137321 further discloses a robot cell (a production device) including a work table, a frame body portion which is provided on the work table, and a robot arm which is attached to the work table. JP-A-2010-137321 discloses a state in which two of the robot cells are lined up.

However, in the robot system which is described in JP-A-2012-187663, when a positioning unit is present in the external device which is external to the cell, every time the cell is moved, work of installing a positioning unit which positions the work with respect to the robot inside the cell, installing the cell such that the robot is positioned in an appropriate position with respect to the positioning unit, or the like becomes necessary. When the positioning unit is present in the outer portion of the cell of the robot, the robot system increases in size.

Since the robot which is described in JP-A-2010-137321 is provided on a ceiling frame, the center of gravity is high and there is a concern that the robot may fall over together with the ceiling frame.

In JP-A-2010-137321, although two robot cells are lined up in close proximity, each of the robot cells is installed individually, and thus, it is difficult to stabilize the center of gravity. Therefore, oscillation of the time at which the robot arm is driven is increased. As a result, it is difficult to stably drive the robot arm.

SUMMARY

The invention has been made in order to solve at least a part of the problems described above and can be implemented as the following forms or application examples.

(Application Example 1) A robot system according to the invention includes a first robot, a first cell which is provided with the first robot and is capable of moving, and a positioning unit which is provided in an inner portion of the first cell and positions a target object.

Accordingly, since a relative position of the positioning unit to the first cell is determined, it is possible to omit the work of installing the cell such that the first robot is positioned in an appropriate position with respect to the positioning unit. Therefore, it is possible to easily relocate the first cell which is provided with the first robot. Since the positioning unit is provided in the inner portion of the first cell, it is possible to further reduce the size of the robot system in comparison with a case in which the positioning unit is provided on the outer portion of the first cell.

(Application Example 2) It is preferable that the robot system according to the invention further includes a first transporter which transports the target object to the positioning unit.

Accordingly, compared to a case in which the first transporter is not included, it is possible to render the transporting of the target object to the positioning unit swifter. By having the first transporter, the first robot is capable of performing other work while in the middle of transporting the target object to the positioning unit using the first transporter. Therefore, it is possible to shorten the tact time.

(Application Example 3) It is preferable that the robot system according to the invention further includes a second transporter which transports the target object, and that the second transporter has a transport direction, in which the target object is transported, different from that of the first transporter.

Accordingly, for example, it is possible to utilize the second transporter as a transporter which discharges the target objects which are defective among the target objects which are transported by the first transporter.

(Application Example 4) It is preferable that the robot system according to the invention further includes a drive unit which drives the first transporter and the second transporter.

Accordingly, it is possible to reduce the number of drive units due to being capable of driving the first transporter and the second transporter using a single drive unit.

(Application Example 5) In the robot system according to the invention, it is preferable that the first transporter and the second transporter each include a portion which is installed in the inner portion of the first cell.

Accordingly, it is possible to further reduce the size of an installation space of the robot system.

(Application Example 6) It is preferable that the robot system according to the invention further includes a third transporter which transports the target object, and that the third transporter has a transport direction, in which the target object is transported, different from that of the second transporter.

Accordingly, for example, it is possible to utilize the third transporter as a transporter which transports the target objects in which the defects of the target objects which are transported by the second transporter are improved.

(Application Example 7) In the robot system according to the invention, it is preferable that the first transporter, the second transporter, and the third transporter each include a portion which is installed in the inner portion of the first cell, that an installation height of the third transporter inside the first cell is higher than an installation height of the second transporter, and that the installation height of the second transporter inside the first cell is higher than an installation height of the first transporter.

Accordingly, for example, it is possible to more easily transport the target object from the first transporter to the second transporter. For example, it is possible to more easily transport the target object from the third transporter to the first transporter using the first robot. Therefore, it is possible to further shorten the tact time.

(Application Example 8) It is preferable that the robot system according to the invention further includes a second robot which mounts the target object on the first transporter, and a second cell which is provided with the second robot, that the first robot operates inside the first cell, and that the second robot operates inside the second cell.

Accordingly, for example, when the first robot is capable of moving inside the second cell, it is necessary to stop the first robot and the second robot when a problem arises inside the second cell and maintenance is performed; however, it is possible to perform the maintenance inside the second cell without the stopping. Therefore, it is possible to reduce a decrease in the overall productivity of the robot system.

(Application Example 9) In the robot system according to the invention, it is preferable that the first robot includes an nth arm which is capable of rotationally moving around an nth (where n is an integer greater than or equal to 1) rotational movement axis, and an (n+1)th arm which is provided in the nth arm so as to be capable of rotationally moving around an (n+1)th rotational movement axis which has an axial direction different from an axial direction of the nth rotational movement axis.

Accordingly, since it is possible to widen the movable range of the first robot, it is possible to further improve the working properties of the first robot.

(Application Example 10) In the robot system according to the invention, it is preferable that a length of the nth arm is longer than a length of the (n+1)th arm, and that it be possible for the nth arm and the (n+1)th arm to overlap as viewed from the axial direction of the (n+1)th rotational movement axis.

Accordingly, it is possible to reduce the size of the space for ensuring that the first robot does not interfere in a case in which the distal end of the (n+1)th arm is caused to move to a position which is different by 180° around the nth rotational movement axis. Accordingly, it is possible to obtain a reduction in the size of the first cell, and thus, it is possible to further reduce the size of the installation space in which to install the robot system.

(Application Example 11) In the robot system according to the invention, it is preferable that the first robot is provided with a base which is provided in the first cell, and that the nth arm is provided on the base.

Accordingly, it is possible to cause the nth arm and the (n+1)th arm to rotationally move with respect to the base.

(Application Example 12) In the robot system according to the invention, it is preferable that the first robot includes a base which is provided in the first cell, an nth arm which is provided on the base and is capable of rotationally moving around an nth (where n is an integer greater than or equal to 1) rotational movement axis, and an (n+1)th arm which is provided to be capable of rotationally moving around an (n+1)th rotational movement axis which has an axial direction which is parallel to an axial direction of the nth rotational movement axis.

Accordingly, it is possible to provide a small first robot having the nth arm which rotationally moves around the nth rotational movement axis and the (n+1)th arm, and it is possible to further reduce the size of the region in which to dispose the first robot.

(Application Example 13) In the robot system according to the invention, it is preferable that, in the first robot, a connecting portion between the base and the nth arm is provided to be positioned vertically above a connecting portion between the nth arm and the (n+1)th arm.

Accordingly, since it is possible to provide the first robot to hang down, it is possible to further widen the working range of the first robot to further vertically below the first robot.

(Application Example 14) In the robot system according to the invention, it is preferable that the first cell includes a ceiling portion and the base is provided on the ceiling portion.

Accordingly, since it is possible to provide the first robot to hang down from the ceiling portion, it is possible to further widen the working range of the first robot to further vertically below the first robot.

(Application Example 15) It is preferable that the robot system according to the invention further includes a changing mechanism which is capable of changing the installation height of the first robot with respect to the first cell.

Accordingly, in a case in which the disposition of the first robot is to be changed according to the operation range of the first robot or the like, it is possible to change the disposition of the first robot without redesigning the overall configuration of the first cell.

(Application Example 16) In the robot system according to the invention, the first robot includes a base which is attached to the first cell and an nth (where n is 1) arm which is connected to the base, and the changing mechanism includes a spacer which changes a separation distance between the base and the first cell.

Accordingly, in a case in which the disposition of the first robot is to be changed to an appropriate position according to the operation range of the first robot or the like, it is possible to easily dispose the first robot at an appropriate position without attaching, removing, or changing the spacer.

(Application Example 17) In the robot system according to the invention, it is preferable that a gas supply unit which supplies a clean gas is provided in the first cell.

Accordingly, it is possible to increase the cleanliness (the degree of cleanness) inside the first cell.

(Application Example 18) In the robot system according to the invention, it is preferable that the gas flows vertically down from the gas supply unit.

Accordingly, it is possible to increase the cleanliness inside the first cell more efficiently.

(Application Example 19) In the robot system according to the invention, it is preferable that the gas supply unit includes a filter.

Accordingly, it is possible to further increase the cleanliness inside the first cell.

(Application Example 20) A robot according to the invention is a robot which is provided in a cell which is capable of moving, in which a positioning unit which positions a target object is present in an inner portion of the cell, and the robot performs work with respect to the target object which is positioned by the positioning unit.

Accordingly, since the relative position of the positioning unit with respect to the cell is determined, it is possible to easily define the position of the target object with respect to the robot.

(Application Example 21) A robot system according to the invention includes a robot, a cell which is provided with the robot and is capable of moving, a control device which controls the robot, a power device which supplies power to the robot, and a work surface on which the robot works, in which each of the control device and the power device is disposed vertically below the work surface.

Accordingly, since it is possible to lower the center of gravity of the cell, it is possible to reduce the concern that the cell will fall over. Therefore, since it is possible to stabilize and support the robot using the cell, it is possible to stabilize the driving of the robot.

(Application Example 22) In the robot system according to the invention, it is preferable that each of the control device and the power device is provided in an inner portion of the cell.

Accordingly, since it is possible to further lower the center of gravity of the cell, it is possible to further reduce the concern that the cell will fall over.

(Application Example 23) In the robot system according to the invention, it is preferable that the robot is provided vertically above the work surface.

Accordingly, since it is possible to render the center of gravity of the cell low as described earlier, it is possible to more stably drive the robot which is provided vertically above the work surface.

(Application Example 24) It is preferable that the robot system according to the invention further includes a transporter which transports a target object, and that the control device control the transporter.

Accordingly, it is possible to perform different work from the work of transporting the target object using the robot in the middle of transporting the target object using the transporter. Therefore, it is possible to shorten the tact time. Since the control device which controls the robot and the device which controls the driving of the transporter may not be provided individually, it is possible to further reduce the size of the robot system.

(Application Example 25) In the robot system according to the invention, it is preferable that the cell includes a base portion facing an installation space in which the cell is installed, and that a weight is provided on the base portion.

Accordingly, since it is possible to further lower the center of gravity of the cell, it is possible to further reduce the concern that the cell will fall over.

(Application Example 26) It is preferable that the robot system according to the invention further includes a transporter which transports a target object, that the cell includes a first side surface portion and a second side surface portion which is different from the first side surface portion, that the transporter is provided to pass through the first side surface portion, and that each of the control device and the power device is possible to remove from the second side surface portion.

Accordingly, for example, when maintaining the control device and the power device, since it is possible to more easily remove the control device and the power device, it is possible to more easily and more swiftly perform the maintenance.

(Application Example 27) In the robot system according to the invention, it is preferable that the robot includes an nth arm which is capable of rotationally moving around an nth (where n is an integer greater than or equal to 1) rotational movement axis, and an (n+1)th arm which is provided to be capable of rotationally moving around an (n+1)th rotational movement axis which has an axial direction different from an axial direction of the nth rotational movement axis.

Accordingly, since it is possible to widen the movable range of the robot, it is possible to further improve the working properties of the robot.

(Application Example 28) In the robot system according to the invention, it is preferable that a length of the nth arm is longer than a length of the (n+1)th arm, and that it is possible for the nth arm and the (n+1)th arm to overlap as viewed from the axial direction of the (n+1)th rotational movement axis.

Accordingly, it is possible to reduce the size of the space for ensuring that the first robot does not interfere in a case in which the distal end of the (n+1)th arm is caused to move to a position which is different by 180° around the nth rotational movement axis. Accordingly, it is possible to obtain a reduction in the size of the cell, and thus, it is possible to further reduce the size of the installation space in which to install the robot system.

(Application Example 29) In the robot system according to the invention, it is preferable that the robot is provided with a base which is provided in the cell, and that the nth arm is provided on the base.

Accordingly, it is possible to cause the nth arm and the (n+1)th arm to rotationally move with respect to the base.

(Application Example 30) In the robot system according to the invention, it is preferable that the robot includes a base which is provided in the cell, an nth arm which is provided on the base and is capable of rotationally moving around an nth (where n is an integer greater than or equal to 1) rotational movement axis, and an (n+1)th arm which is provided in the nth arm so as to be capable of rotationally moving around an (n+1)th rotational movement axis which has an axial direction which is parallel to an axial direction of the nth rotational movement axis.

Accordingly, it is possible to provide a small robot having the nth arm which rotationally moves around the nth rotational movement axis and the (n+1)th arm, and it is possible to further reduce the size of the region in which to dispose the robot.

(Application Example 31) In the robot system according to the invention, it is preferable that, in the robot, a connecting portion between the base and the nth arm is provided to be positioned vertically above a connecting portion between the nth arm and the (n+1)th arm.

Accordingly, since it is possible to provide the robot to hang down, it is possible to further widen the working range of the robot to further vertically below the robot.

(Application Example 32) In the robot system according to the invention, it is preferable that the cell includes a ceiling portion and the base is provided on the ceiling portion.

Accordingly, since it is possible to provide the robot to hang down from the ceiling portion, it is possible to further widen the working range of the robot to further vertically below the robot.

(Application Example 33) A robot according to the invention is a robot which is provided in a cell which is capable of moving, in which a space of an inner portion of the cell includes a first space which is closer to a top side in a vertical direction than a first member and a second space which is closer to a bottom side in the vertical direction than the first member, in which each of a control device which controls the robot and a power device which supplies power to the robot is disposed in the second space, and in which the robot works in the first space.

Accordingly, since the robot is provided in a cell with a low center of gravity, it is possible to stably support the robot using the cell and it is possible to provide a robot which is stably driven.

(Application Example 34) A robot system according to the invention includes a first robot, a first cell which is provided with the first robot and is capable of moving, a second robot, a second cell which is provided with the second robot and is capable of moving, and a connecting portion which connects the first cell and the second cell.

Accordingly, since it is possible to reduce the total installation area of the first cell and the second cell, it is possible to reduce the total installation area (the aspect ratio) with respect to the heights of the first cell and the second cell. Therefore, since it is possible to stably install the first cell and the second cell, it is possible to more stably drive the first robot and the second robot.

(Application Example 35) In the robot system according to the invention, it is preferable that the connecting portion connects a top portion of the first cell and a top portion of the second cell.

Accordingly, it is possible to further reduce the oscillation in the top portion of the first cell and the top portion of the second cell in particular. Therefore, it is possible to more stably drive the first robot and the second robot in a case in which the first robot is provided on the top portion of the first cell and the second robot is provided on the top portion of the second cell in particular.

(Application Example 36) In the robot system according to the invention, it is preferable that the connecting portion includes a first transporter which transports a target object.

Accordingly, it is possible to connect the first cell and the second cell and it is possible to transport the target object between the first cell and the second cell using the first transporter.

(Application Example 37) In the robot system according to the invention, it is preferable that inspection of the target object which is transported by the first transporter is possible.

Accordingly, while the target object is being transported, for example, it is possible to perform an inspection as to whether a component or the like is accurately embedded in the target object. In this manner, since it is possible to inspect the target object while transporting, it is possible to further shorten the tact time.

(Application Example 38) In the robot system according to the invention, it is preferable that at least a portion of the first robot is capable of moving to an outer portion of the first cell.

Accordingly, since the working range of the first robot is widened, it is possible to perform yet more work using the first robot. In particular, in a case in which the first cell is small, when the work table is installed on the outer portion of the first cell, the first robot is capable of performing work on the work table.

(Application Example 39) It is preferable that the robot system according to the invention further includes a second transporter which is positioned on an outer portion of the first cell, and that the first robot is capable of gripping a target object which is mounted on the second transporter.

Accordingly, for example, it is possible to grip the target object on the second transporter using the first robot, move the target object to the first transporter, and mount the target object. In this manner, it is possible to widen the working range of the first robot.

BRIEF DESCRIPTION OF DRAWINGS

FIG. 18 is a diagram illustrating a connecting plate (a connecting portion) which is included in the robot system illustrated in FIG. 17.

FIGS. 20A and 20B are diagrams illustrating another example of a connection of the two first transporters illustrated in FIGS. 19A and 19B.

DETAILED DESCRIPTION

Hereinafter, a detailed description will be given of a robot system and a robot according to the invention based on favorable embodiments which are illustrated in the appended drawings.

Robot System

First Embodiment

Figure 1:
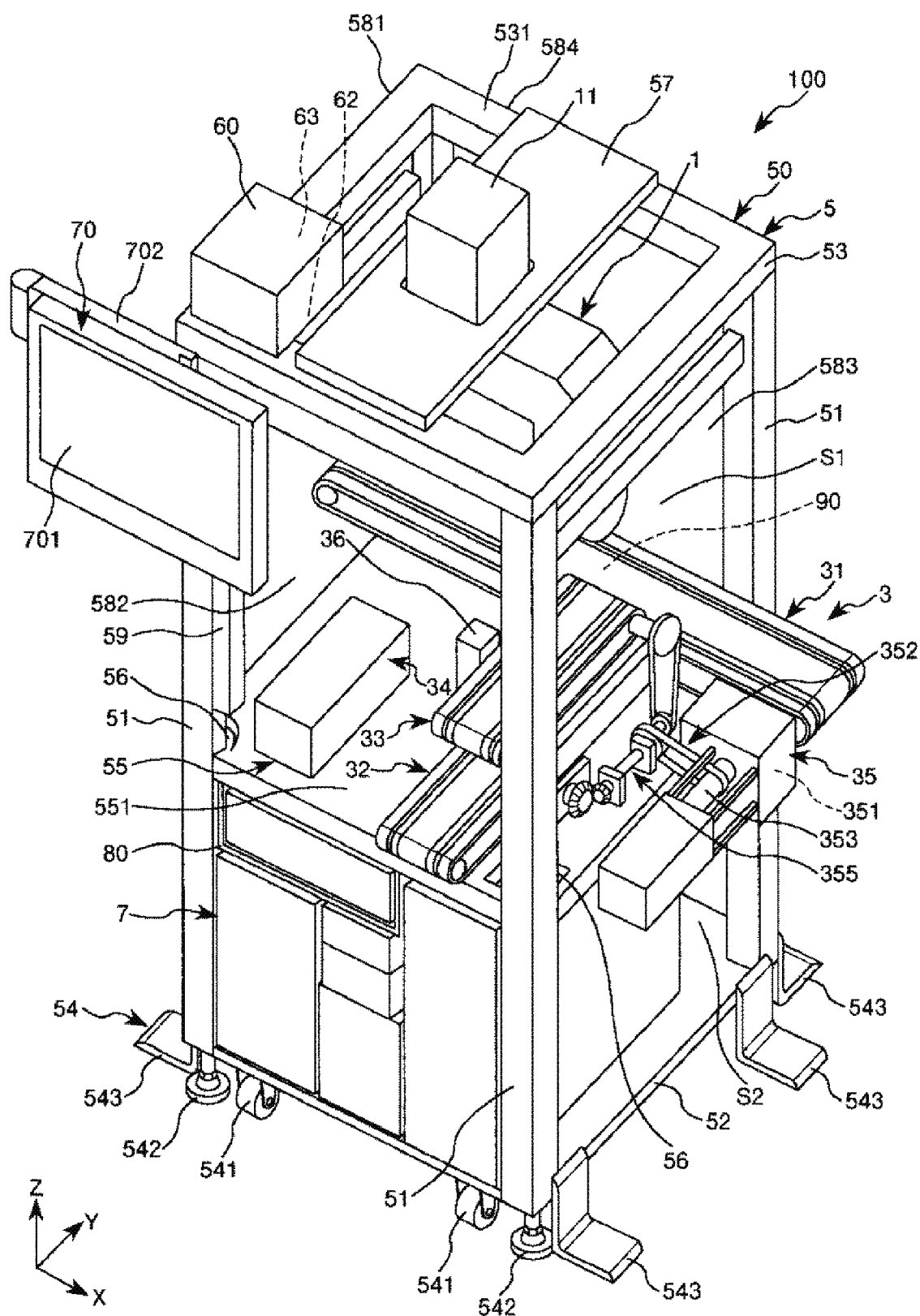
FIG. 1 is a perspective view illustrating a first embodiment of a robot system according to the invention.
Figure 2:
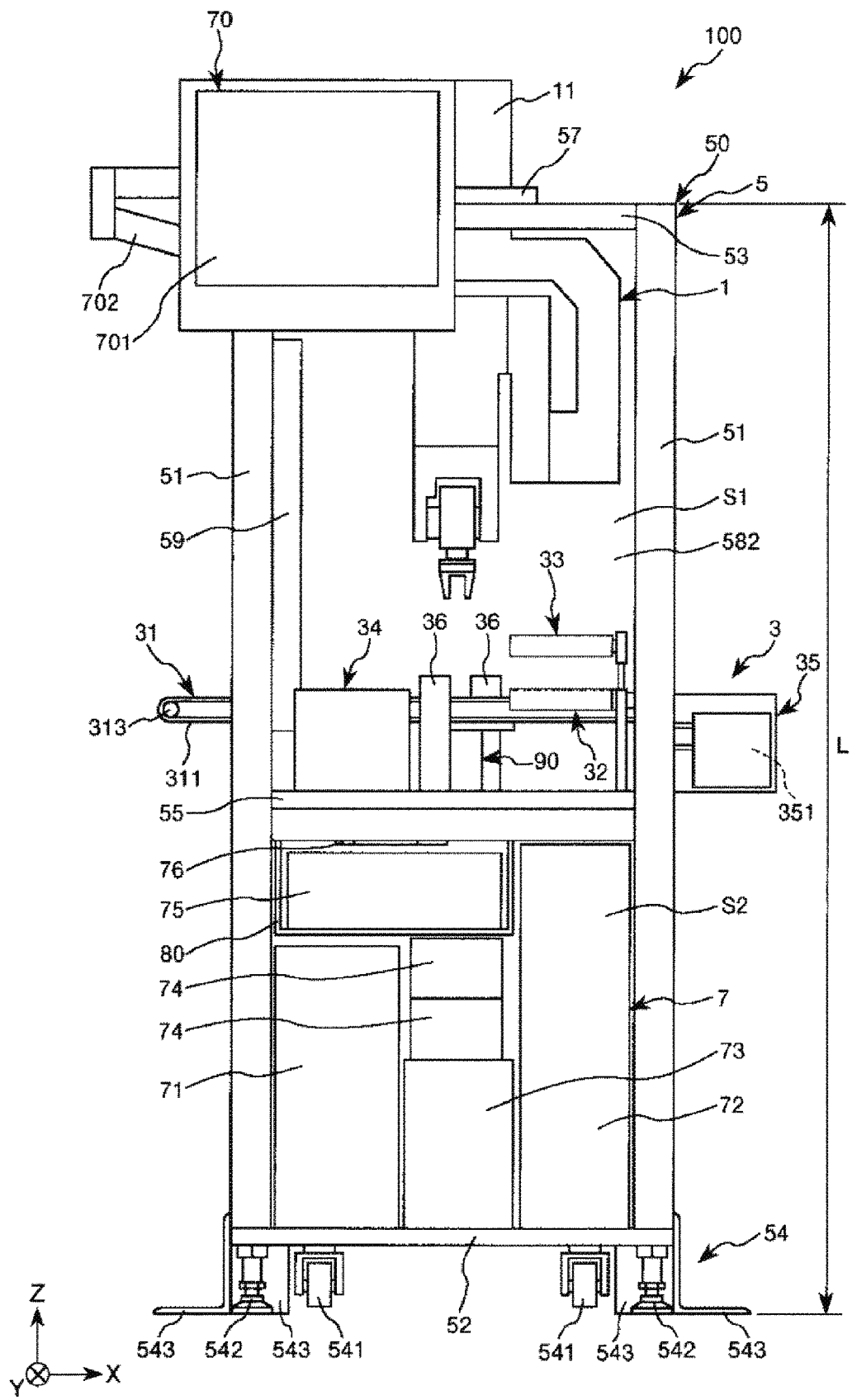
FIG. 2 is a front view of the robot system illustrated in FIG. 1.
Figure 3:
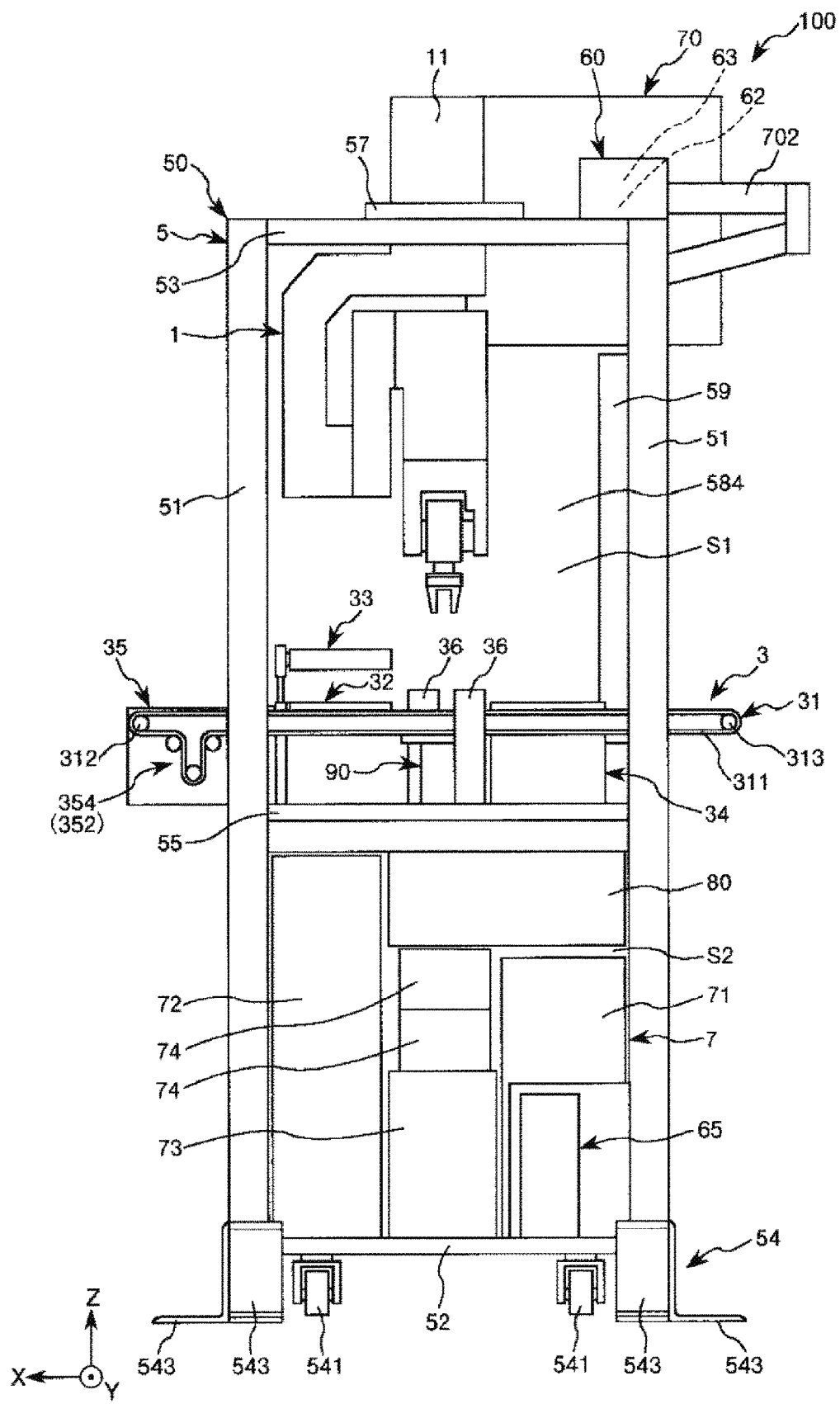
FIG. 3 is a rear view of the robot system illustrated in FIG. 1.
Figure 4:
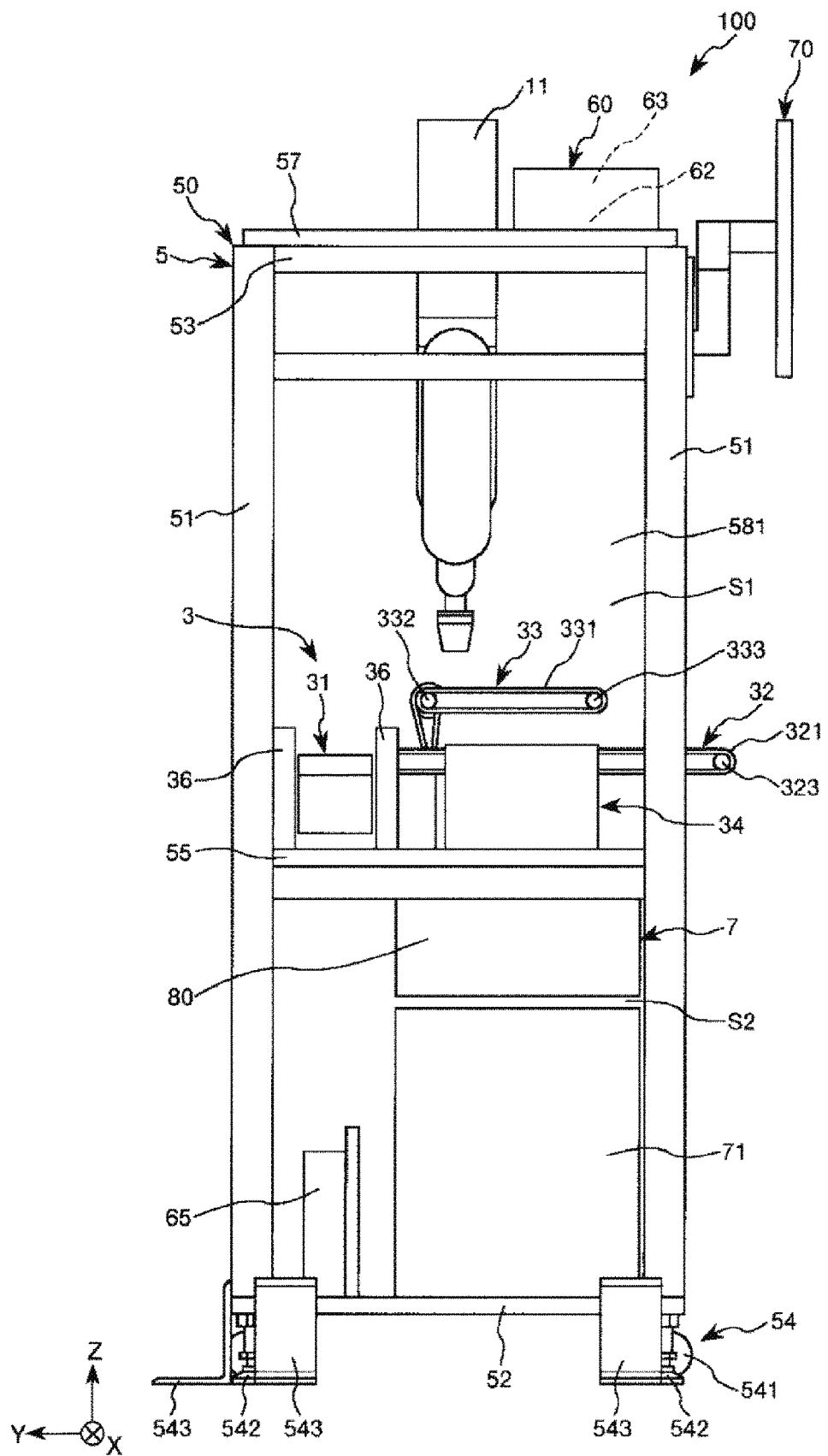
FIG. 4 is a left-side view of the robot system illustrated in FIG. 1.
Figure 5:
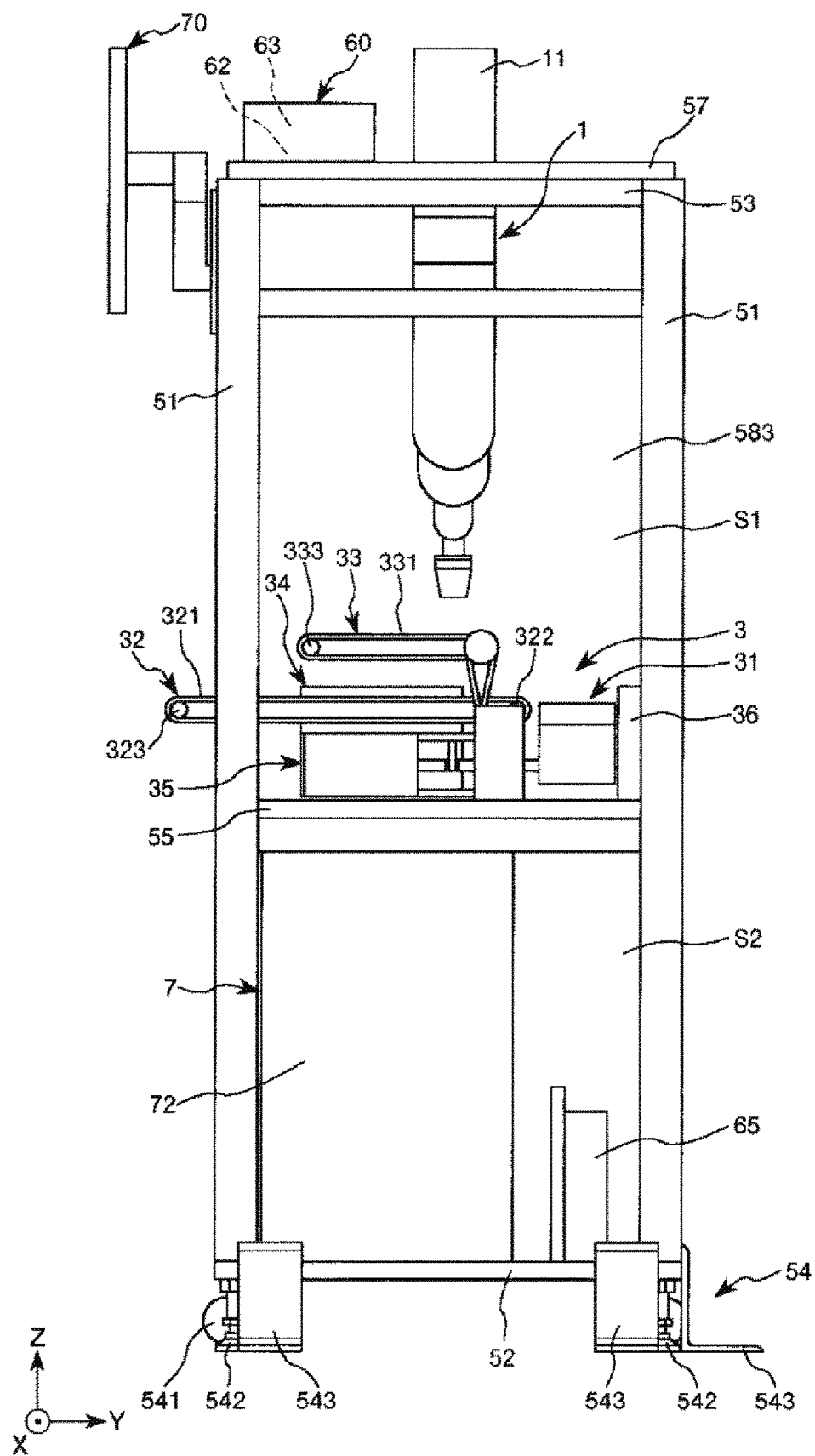
FIG. 5 is a right-side view of the robot system illustrated in FIG. 1.
Figure 6:
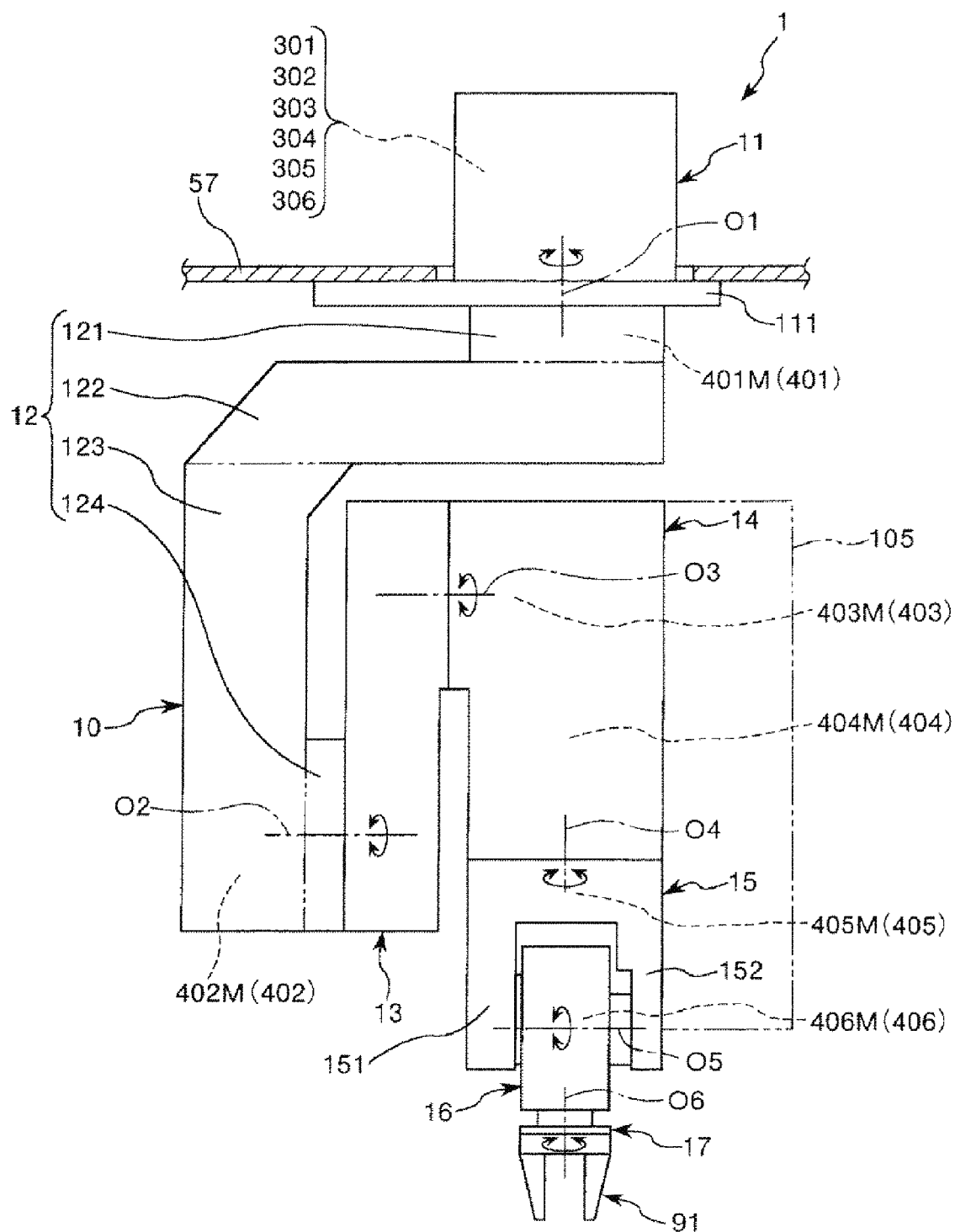
FIG. 6 is a diagram of the robot illustrated in FIG. 1.
Figure 7:
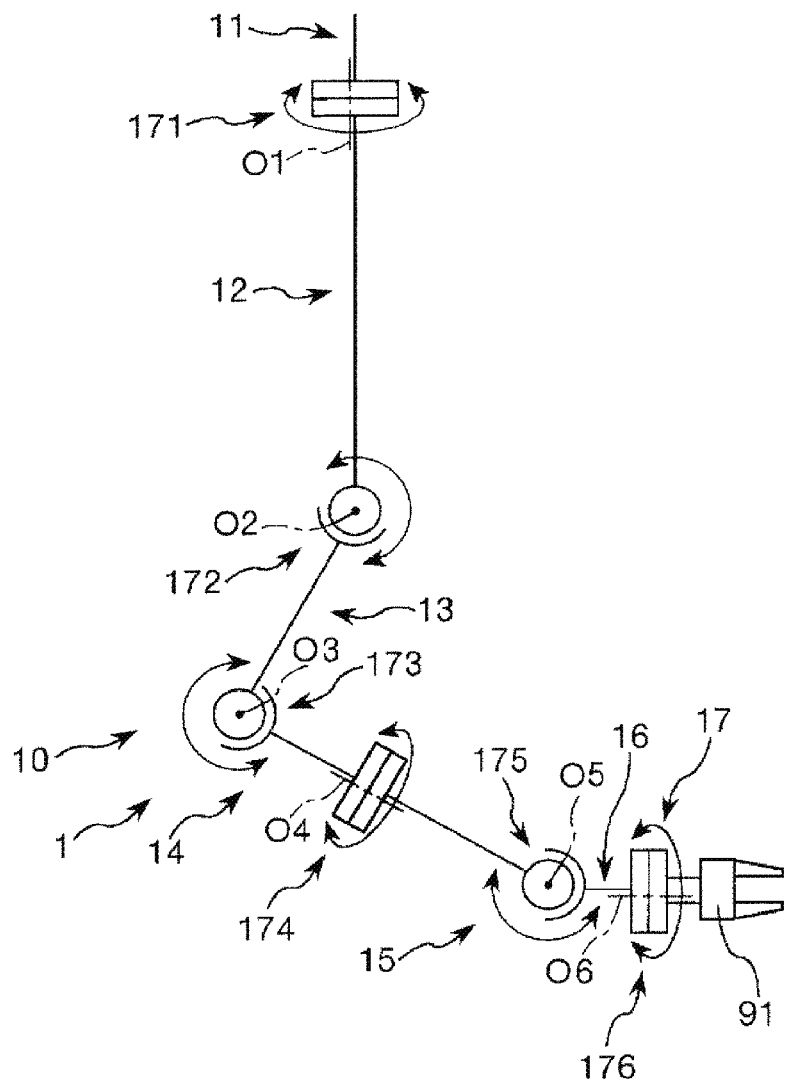
FIG. 7 is a schematic diagram of the robot illustrated in FIG. 6.
Figure 8:
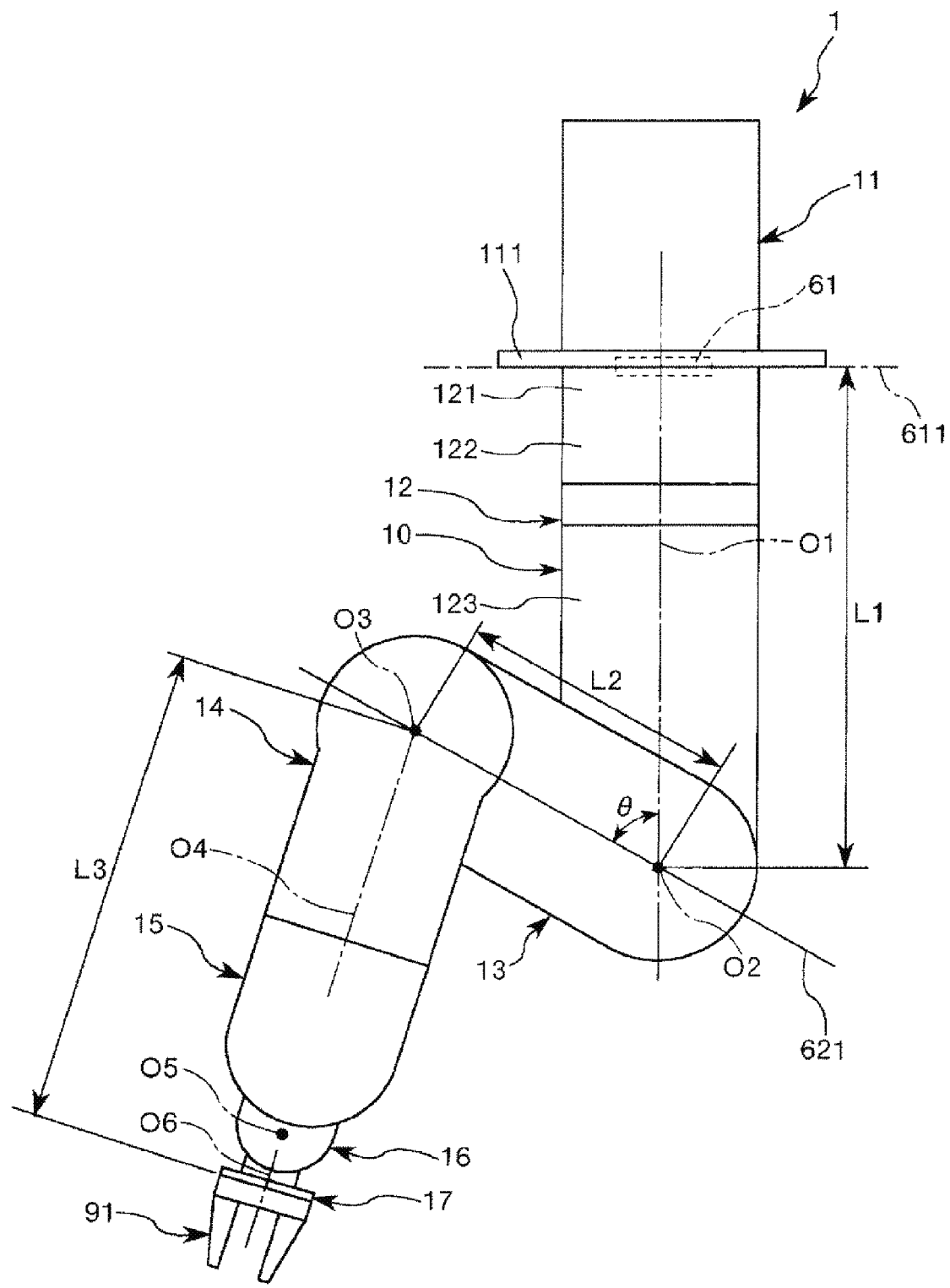
FIG. 8 is a side view of the robot illustrated in FIG. 6.
Figure 9:
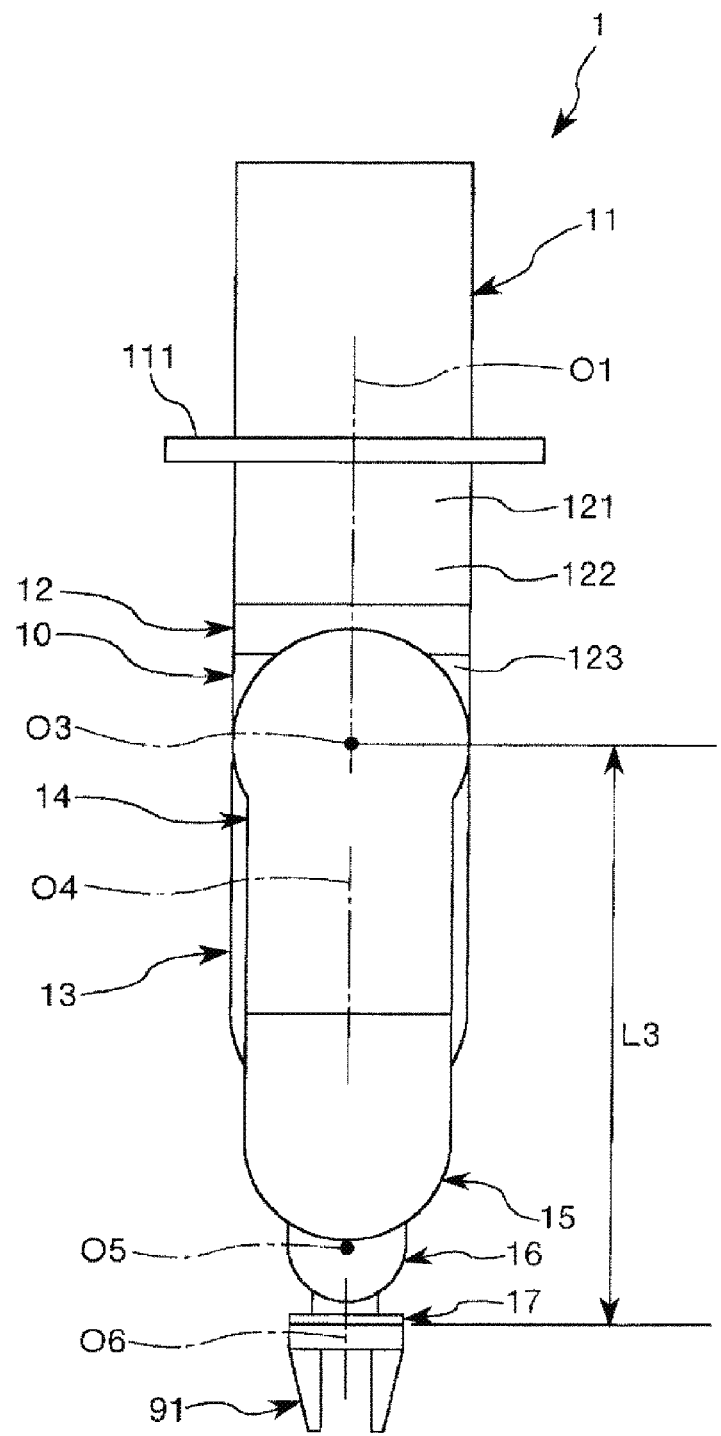
FIG. 9 is a side view of the robot illustrated in FIG. 6.
Figure 10:
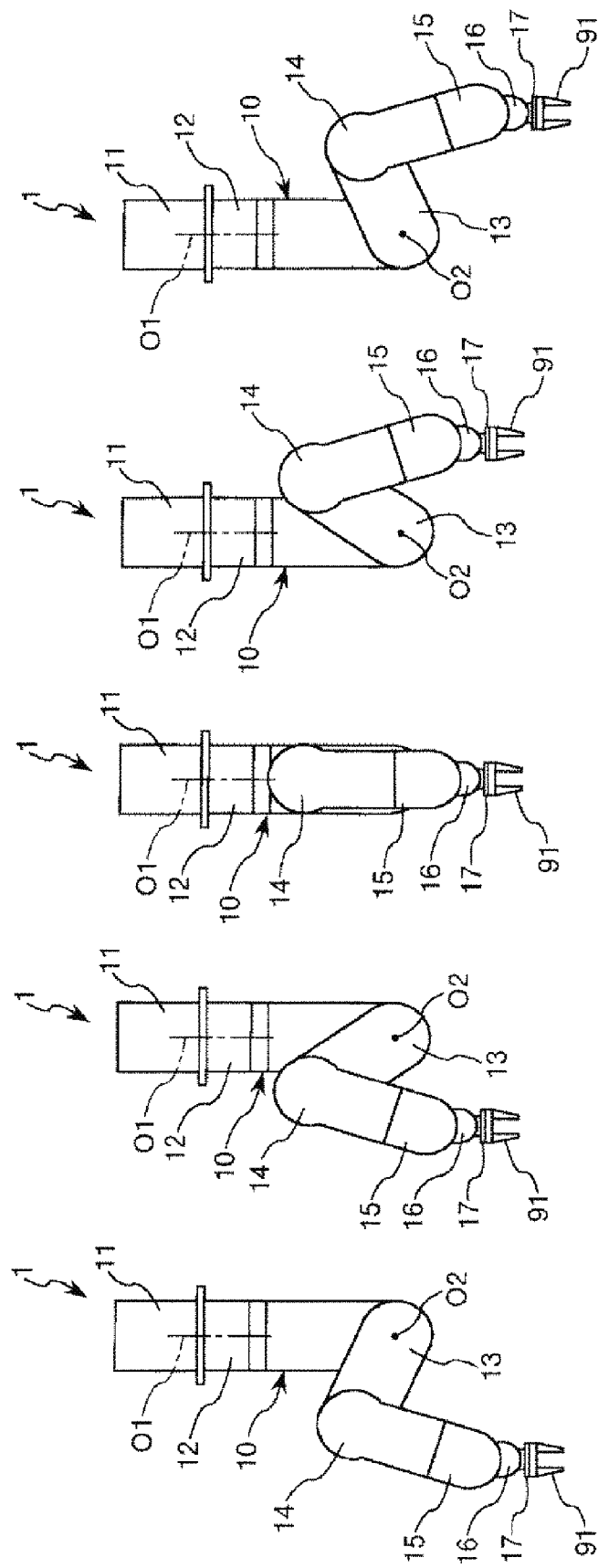
FIGS. 10A-10E are diagrams for describing the operations of the robot illustrated in FIG. 6.
Figure 11:
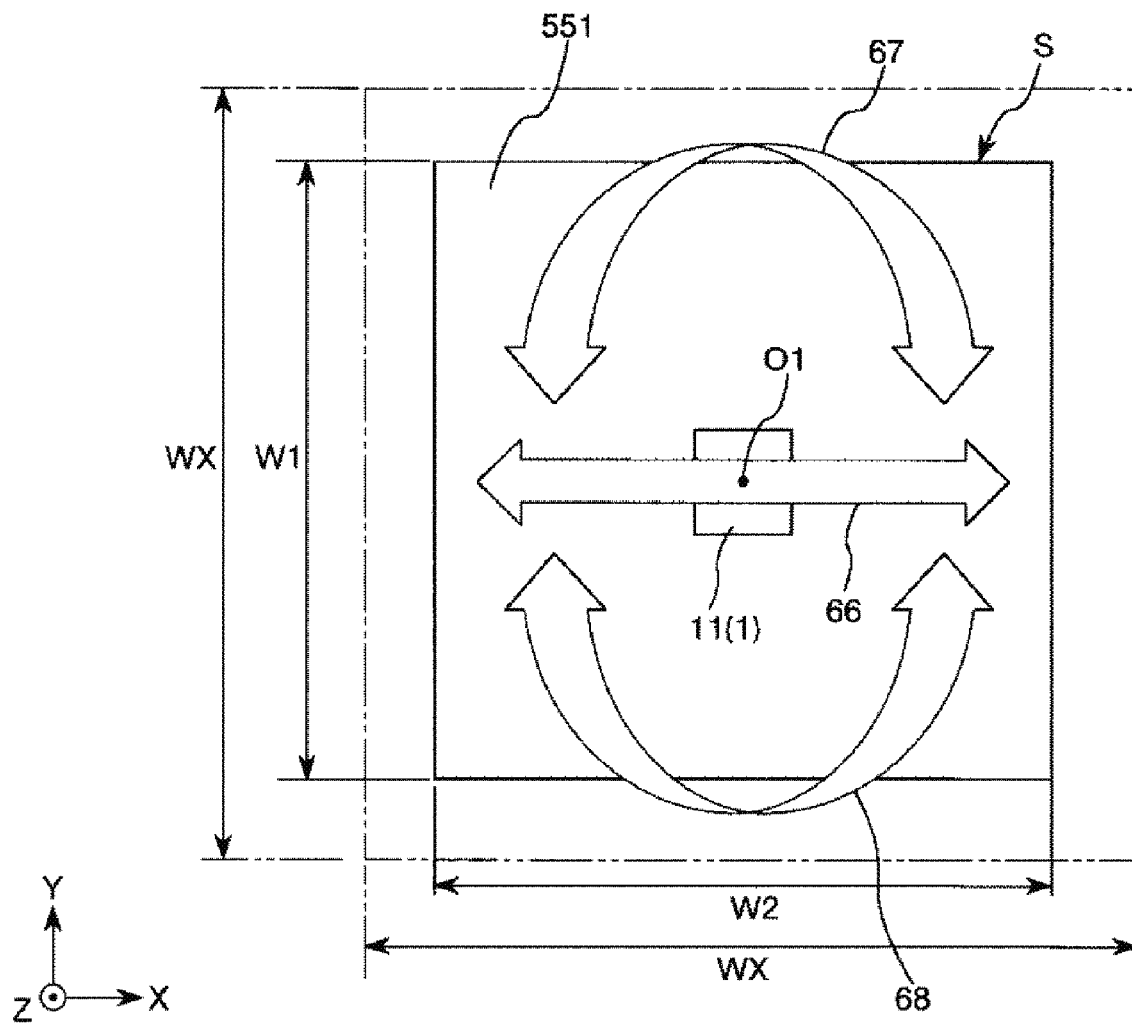
FIG. 11 is a diagram illustrating a movement path of a distal end portion of a robot arm which is included in the robot illustrated in FIG. 6.
Figure 12:
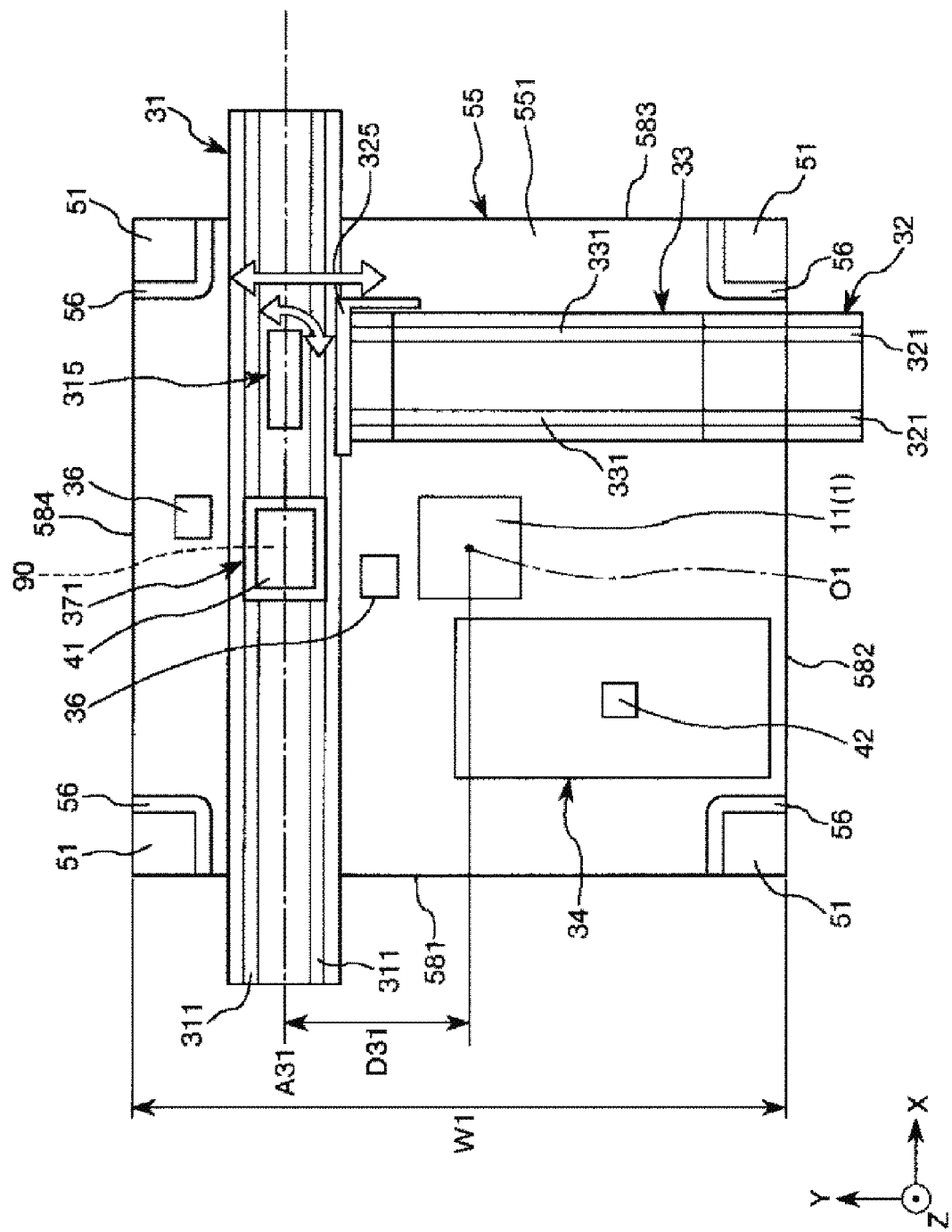
FIG. 12 is a plan view of a transport unit illustrated in FIG. 1.
Figure 13:
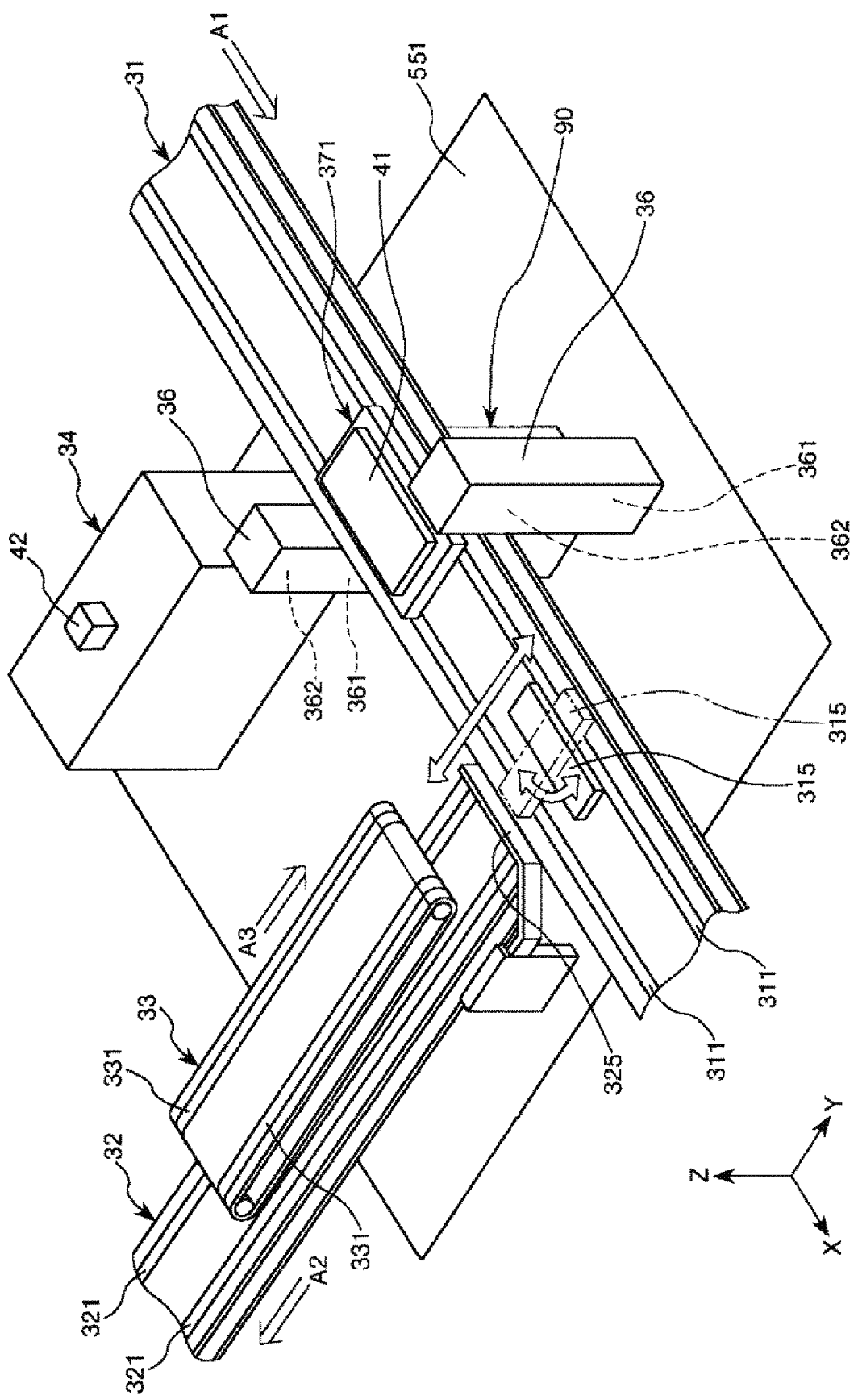
FIG. 13 is a perspective view of the transport unit illustrated in FIG. 1.
Figure 14A:
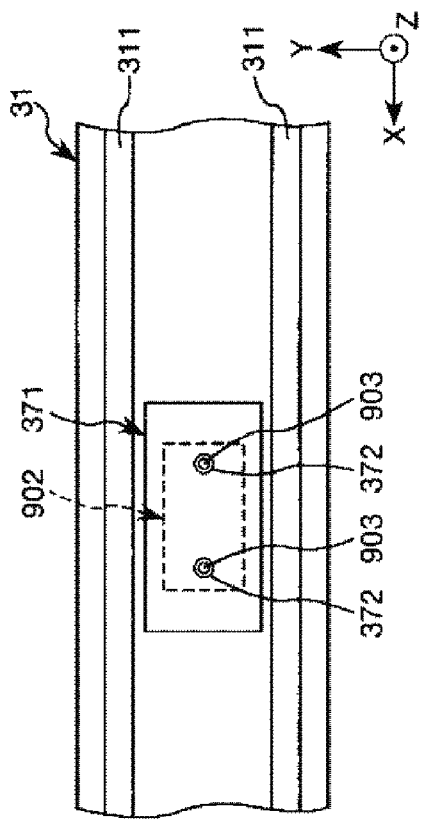
FIGS. 14A and 14B are diagrams illustrating a positioning unit illustrated in FIG. 13.
Figure 14B:
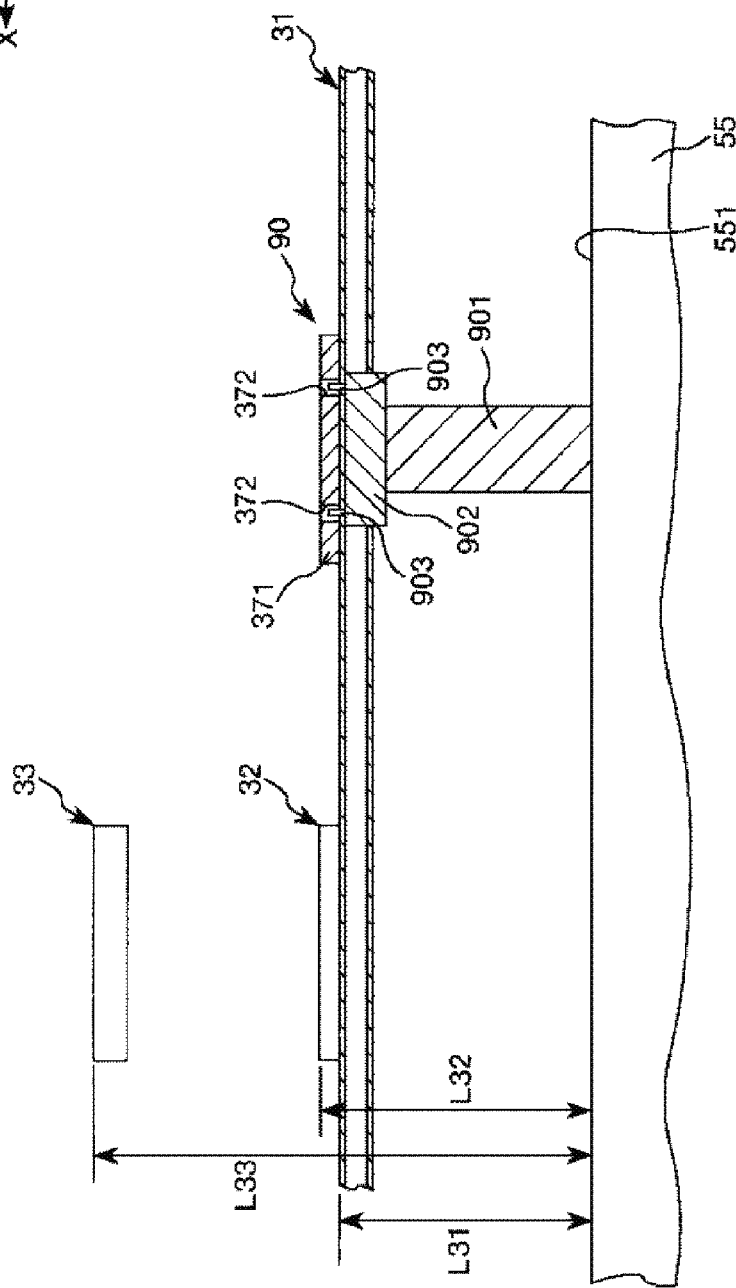

FIG. 1 is a perspective view illustrating a first embodiment of a robot system according to the invention. FIG. 2 is a front view of the robot system illustrated in FIG. 1. FIG. 3 is a rear view of the robot system illustrated in FIG. 1. FIG. 4 is a left-side view of the robot system illustrated in FIG. 1. FIG. 5 is a right-side view of the robot system illustrated in FIG. 1. FIG. 6 is a diagram of the robot illustrated in FIG. 1. FIG. 7 is a schematic diagram of the robot illustrated in FIG. 6. Each of FIGS. 8 and 9 is a side view of the robot illustrated in FIG. 6. FIGS. 10A-10E are diagrams for describing the operations of the robot illustrated in FIG. 6. FIG. 11 is a diagram illustrating a movement path of a distal end portion of a robot arm which is included in the robot illustrated in FIG. 6. FIG. 12 is a plan view of a transport unit illustrated in FIG. 1. FIG. 13 is a perspective view of the transport unit illustrated in FIG. 1. FIGS. 14A and 14B are diagrams illustrating a positioning unit illustrated in FIG. 13.

Hereinafter, to facilitate the description, the top side in FIGS. 1 to 10E and FIGS. 14A and 14B will be referred to as "the top" or "above" and the bottom side will be referred to as "the bottom" or "below" (the same applies to FIGS. 15, 16A, and 17 which will be described later). The base side in FIGS. 1 to 10E will be referred to as "the base end" or "upstream" and the opposite side (the hand side) will be referred to as "the distal end" or "downstream" (the same applies to FIGS. 15 and 17 which will be described later). The up-down direction in FIGS. 2 to 10E will be referred to as "the vertical direction" and the left-right direction will be referred to as "the horizontal direction" (the same applies to FIGS. 15, 16A, and 17 which will be described later). In FIGS. 1 to 5 and FIGS. 11 to 14B, to facilitate the description, an X axis, a Y axis, and a Z axis are illustrated as three axes which are perpendicular to each other (the same applies to FIGS. 15 to 20B which will be described later). Hereinafter, a direction parallel to the X axis will be referred to as "the X-axis direction", a direction parallel to the Y axis will be referred to as "the Y-axis direction", and a direction parallel to the Z axis will be referred to as "the Z-axis direction". Hereinafter, the distal end side of each of the illustrated arrows will be referred to using "+(plus)" and the base end side will be referred to using "−(minus)".

A robot system 100 illustrated in FIGS. 1 to 5 includes a robot cell 50 having a cell (a first cell) 5 and a robot (a first robot) 1, a transport unit 3, a positioning unit 90, imaging units 36, a control unit 7, a display operation unit 70, and a gas supply unit 60.

For example, it is possible to use the robot system 100 in a manufacturing process or the like of manufacturing precision equipment such as wristwatches or the like.

Hereinafter, a description will be given of the parts which configure the robot system 100 sequentially.
(Cell)

The cell 5 which is illustrated in FIGS. 1 to 5 is a frame body surrounding the robot 1 and it is possible to easily perform relocation of the cell 5.

The cell 5 includes a foot portion 54 which allows the entirety of the cell 5 to be installed on an installation space such as the ground (the floor), a base portion 52 which is supported by the foot portion 54, four support columns 51 which are provided on the base portion 52, and a ceiling portion (an attachment portion) 53 which is provided to stand on the four support columns 51. The cell 5 includes a work portion (a first member) 55 which is attached to the four support columns 51 which are provided between the base portion 52 and the ceiling portion 53.

The base portion 52 has a quadrilateral plate shape in plan view (viewed from the vertical direction) and faces the installation space. The control unit 7 is provided on the base portion 52.

The foot portion 54 includes a plurality of casters 541, adjusters (feet) 542, and fixing tools 543 which are provided on the corner portions of the base portion 52. The cell 5 is capable of moving due to the casters 541. The cell 5 is leveled in the installation space by the adjusters 542. The cell 5 is fixed in the installation space by the fixing tools 543.

The lower end portions of the four support columns 51 are attached to the respective corner portions of the base portion 52. The plate-shaped work portion 55 is attached to each center portion of the four support columns 51 in the longitudinal direction.

The top surface of the work portion 55 faces the ceiling portion 53 and serves as a work surface 551 on which the robot 1 is capable of performing work of supplying material, removing material, and the like of components. The transport unit 3 is provided on the work portion 55 and the work surface 551 also functions as a mounting surface on which the transport unit 3 is mounted.

A gap 56 is provided between the work portion 55 and the support columns 51. Although not illustrated, cables (wiring), piping, and the like which join the control unit 7 (described later) to the robot 1 are passed through the gap 56. A wiring duct 59 which travels along the longitudinal direction of the support column 51 and through which the cables, the piping, and the like are passed is attached to the support column 51. The cables, the piping, and the like are passed through to the wiring duct 59 from the gap 56. Due to the gap 56 and the wiring duct 59 being provided, it is possible to prevent the cables, the piping, and the like from becoming hindrances to the transport unit 3 and the robot 1. The number and the arrangement of the gap 56 and the wiring duct 59 are not limited to those illustrated and are arbitrary.

The ceiling portion 53 has a quadrilateral frame shape in plan view and the top end portions of the corner portions of the ceiling portion 53 are connected to the support columns 51. The ceiling portion 53 is a member which supports the robot 1 and the top surface of the ceiling portion 53 is a ceiling surface (an attachment surface) 531. A base 11 of the robot 1 (described later) is supported on the ceiling surface 531 via an attachment plate 57. Accordingly, the robot 1 is supported by the cell 5 so as to hang down.

The cell 5 includes four side surface portions, each of which is provided between two adjacent support columns 51. Hereinafter, the side surface portion of the −X axis side is "a first side surface portion 581", the side surface portion of the −Y axis side is "a second side surface portion 582", the side surface portion of the +X axis side is "a third side surface portion 583", and the side surface portion of the +Y axis side is "a fourth side surface portion 584".

The cell 5 includes the internal space which is surrounded by the four side surface portions 581, 582, 583, and 584, the base portion 52, and the ceiling portion 53. Hereinafter, the space between the ceiling portion 53 and the work portion 55 of the internal space is "a first space S1" and the space between the base portion 52 and the work portion 55 is "a second space S2".

While not illustrated, safety plates for ensuring that the worker (a human) and foreign matter such as dust, for example, do not enter the first space S1 are installed on the portions facing the first space S1 among the first side surface portion 581, the second side surface portion 582, the third side surface portion 583, and the fourth side surface portion 584 and the ceiling portion 53. While not illustrated, safety plates for protecting the control unit 7, for example, are installed on the portions facing the second space S2 among the first side surface portion 581, the second side surface portion 582, the third side surface portion 583, and the fourth side surface portion 584. Each of the safety plates may be omitted if necessary.

As described earlier, the cell 5 is rendered capable of moving by the casters 541; however, it is also possible to transport the cell 5 using a transport apparatus such as a forklift (not illustrated). The cell 5 may include a movement mechanism (not illustrated) which moves the cell 5 using a driving force of a motor or the like and a movement controller (not illustrated) which controls the driving of the movement mechanism and may be configured to drive itself.

In the prior description, the ceiling portion 53 and the attachment plate 57 are configured to be distinct bodies; however, the ceiling portion 53 and the attachment plate 57 may be integrated.

Robot The robot 1 illustrated in FIG. 1 is capable of performing work such as material supply, removing material, transporting, and assembly of precision equipment and components (target objects) which configure the precision equipment.

As illustrated in FIG. 6, the robot 1 includes the base 11 and a robot arm 10. The robot arm 10 is provided with a first arm (an nth arm) 12, a second arm (an (n+1)th arm) 13, a third arm 14, a fourth arm 15, a fifth arm 16, a sixth arm 17 (six arms), a first drive source 401, a second drive source 402, a third drive source 403, a fourth drive source 404, a fifth drive source 405, and a sixth drive source 406 (six drive sources). For example, it is possible to attach, in a detachable manner, an end effector such as a hand 91 which grips the precision equipment, the components or the like to the distal end of the sixth arm 17.

The robot 1 is a vertical multi-jointed (six axes) robot in which the base 11, the first arm 12, the second arm 13, the third arm 14, the fourth arm 15, the fifth arm 16, and the sixth arm 17 are joined in order from the base end side toward the distal end side. Hereinafter, the first arm 12, the second arm 13, the third arm 14, the fourth arm 15, the fifth arm 16, and the sixth arm 17 will also be collectively referred to as "arms". The first drive source 401, the second drive source 402, the third drive source 403, the fourth drive source 404, the fifth drive source 405, and the sixth drive source 406 will also be collectively referred to as "drive sources (drive units)".

The base 11 is a portion (a member which is attached) which is fixed to the attachment plate 57. In the present embodiment, a plate-shaped flange 111 which is provided on the bottom portion of the base 11 is fixed to the reverse surface (the surface of the vertical bottom side) of the attachment plate 57; however, the portion which is fixed to the attachment plate 57 is not limited thereto and may be the top surface of the base 11, for example. The fixing method is not particularly limited, for example, it is possible to adopt a fixing method or the like which uses a plurality of bolts.

The robot arm 10 is supported to be capable of moving rotationally with respect to the base 11 and each of the arms 12 to 17 is independently supported to be capable of being displaced with respect to the base 11.

The first arm 12 has a curved shape. The first arm 12 includes a first portion 121 which is connected to the base 11 and extends downward from the base 11 in the vertical direction, a second portion 122 which extends in the horizontal direction from the bottom end of the first portion 121, a third portion 123 which is provided on the opposite end portion of the second portion 122 from the first portion 121 and extends in the vertical direction, and a fourth portion 124 which extends in the horizontal direction from the distal end of the third portion 123. The first portion 121, the second portion 122, the third portion 123, and the fourth portion 124 are formed integrally. The second portion 122 and the third portion 123 are substantially perpendicular (intersecting) as viewed from the front of the paper surface of FIG. 6 (in front view which is perpendicular to both a first rotational movement axis O1 and a second rotational movement axis O2 which will be described later).

The second arm 13 has a longitudinal shape and is connected to the distal end portion (the opposite end portion of the fourth portion 124 from the third portion 123) of the first arm 12.

The third arm 14 has a longitudinal shape and is connected to the opposite end portion of the second arm 13 from the end portion to which the first arm 12 is connected.

The fourth arm 15 is connected to the opposite end portion of the third arm 14 from the end portion to which the second arm 13 is connected. The fourth arm 15 includes a pair of support portions 151 and 152 which face each other. The support portions 151 and 152 are used in the connection of the fifth arm 16.

The fifth arm 16 is positioned between the support portions 151 and 152 and is connected to the fourth arm 15 by being connected to the support portions 151 and 152. The fourth arm 15 is not limited to this structure, and, for example, there may be a single support portion (one-sided).

The sixth arm 17 has a flat plate shape and is connected to the distal end portion of the fifth arm 16. The hand 91 is mounted, in a detachable manner, to the distal end portion (the end portion of the opposite side from the fifth arm 16) of the sixth arm 17. Examples of the hand 91 are not particularly limited, and for example, include a hand which is configured to include a plurality of finger portions (fingers).

The exterior of each of the arms 12 to 17 may be configured by a single member and may be configured by a plurality of members.

Next, a description will be given of the driving of the arms 12 to 17 and the drive sources 401 to 406 with reference to FIGS. 6 and 7. FIG. 7 schematically illustrates the robot 1 and illustrates a state in which FIG. 6 is viewed from the right side. In FIG. 7, a state in which the arms 13 to 17 are rotationally moved from the state illustrated in FIG. 6 is illustrated.

As illustrated in FIG. 7, the base 11 is connected to the first arm 12 via a joint (a connecting portion) 171. The joint 171 may or may not be included in the base 11. The joint 171 includes a mechanism which supports the first arm 12 which is connected to the base 11 in a manner in which the first arm 12 is capable of rotational movement with respect to the base 11. Accordingly, the first arm 12 is capable of rotational movement centered on the first rotational movement axis (an nth rotational movement axis) which is parallel to the vertical direction (around the first rotational movement axis O1) with respect to the base 11. The first rotational movement axis O1 is the rotational movement axis on the most upstream side of the robot 1. The rotational movement around the first rotational movement axis O1 is carried out through the driving of the first drive source 401 which includes a motor 401M. The first drive source 401 is driven by the motor 401M and a cable (not illustrated) and the motor 401M is controlled by the control unit 7 (a control device 71) via a motor driver 301 which is electrically connected. The first drive source 401 may be configured to transmit the driving force from the motor 401M using a decelerator (not illustrated) which is provided with the motor 401M, and the decelerator may be omitted.

The first arm 12 and the second arm 13 are connected via a joint (a connecting portion) 172. The joint 172 includes a mechanism which supports the first arm 12 and the second arm 13 which are connected to each other such that one is capable of rotational movement with respect to the other. Accordingly, the second arm 13 is capable of rotational movement centered on the second rotational movement axis (an (n+1)th rotational movement axis) O2 which is parallel to the horizontal direction (around the second rotational movement axis O2) with respect to the first arm 12. The second rotational movement axis O2 is perpendicular to the first rotational movement axis O1. The rotational movement around the second rotational movement axis O2 is carried out through the driving of the second drive source 402 which includes a motor 402M. The second drive source 402 is driven by the motor 402M and a cable (not illustrated) and the motor 402M is controlled by the control unit 7 (the control device 71) via a motor driver 302 which is electrically connected. The second drive source 402 may be configured to transmit the driving force from the motor 402M using a decelerator (not illustrated) which is provided with the motor 402M, and the decelerator may be omitted. The second rotational movement axis O2 may be parallel to the axis which is perpendicular to the first rotational movement axis O1, and the axial directions of the second rotational movement axis O2 and the first rotational movement axis O1 may differ from each other even if the axial direction of the second rotational movement axis O2 is not perpendicular to that of the first rotational movement axis O1.

The second arm 13 and the third arm 14 are connected via a joint (a connecting portion) 173. The joint 173 includes a mechanism which supports the second arm 13 and the third arm 14 which are connected to each other such that one is capable of rotational movement with respect to the other. Accordingly, the third arm 14 is capable of rotational movement centered on the third rotational movement axis O3 which is parallel to the horizontal direction (around the third rotational movement axis O3) with respect to the second arm 13. The third rotational movement axis O3 is parallel to the second rotational movement axis O2. The rotational movement around the third rotational movement axis O3 is carried out through the driving of the third drive source 403. The third drive source 403 is driven by a motor 403M and a cable (not illustrated) and the motor 403M is controlled by the control unit 7 (the control device 71) via a motor driver 303 which is electrically connected. The third drive source 403 may be configured to transmit the driving force from the motor 403M using a decelerator (not illustrated) which is provided with the motor 403M, and the decelerator may be omitted.

The third arm 14 and the fourth arm 15 are connected via a joint (a connecting portion) 174. The joint 174 includes a mechanism which supports the third arm 14 and the fourth arm 15 which are connected to each other such that one is capable of rotational movement with respect to the other. Accordingly, the fourth arm 15 is capable of rotational movement centered on the fourth rotational movement axis O4 which is parallel to a center axis direction of the third arm 14 (around the fourth rotational movement axis O4) with respect to the third arm 14. The fourth rotational movement axis O4 is perpendicular to the third rotational movement axis O3. The rotational movement around the fourth rotational movement axis O4 is carried out through the driving of the fourth drive source 404. The fourth drive source 404 is driven by a motor 404M and a cable (not illustrated) and the motor 404M is controlled by the control unit 7 (the control device 71) via a motor driver 304 which is electrically connected. The fourth drive source 404 may be configured to transmit the driving force from the motor 404M using a decelerator (not illustrated) which is provided with the motor 404M, and the decelerator may be omitted. The fourth rotational movement axis O4 may be parallel to the axis which is perpendicular to the third rotational movement axis O3, and the axial directions of the fourth rotational movement axis O4 and the third rotational movement axis O3 may differ from each other even if the axial direction of the fourth rotational movement axis O4 is not perpendicular to that of the third rotational movement axis O3.

The fourth arm 15 and the fifth arm 16 are connected via a joint (a connecting portion) 175. The joint 175 includes a mechanism which supports the fourth arm 15 and the fifth arm 16 which are connected to each other such that one is capable of rotational movement with respect to the other. Accordingly, the fifth arm 16 is capable of rotational movement centered on the fifth rotational movement axis O5 which is perpendicular to a center axis direction of the fourth arm 15 (around the fifth rotational movement axis O5) with respect to the fourth arm 15. The fifth rotational movement axis O5 is perpendicular to the fourth rotational movement axis O4. The rotational movement around the fifth rotational movement axis O5 is carried out through the driving of the fifth drive source 405. The fifth drive source 405 is driven by a motor 405M and a cable (not illustrated) and the motor 405M is controlled by the control unit 7 (the control device 71) via a motor driver 305 which is electrically connected. The fifth drive source 405 may be configured to transmit the driving force from the motor 405M using a decelerator (not illustrated) which is provided with the motor 405M, and the decelerator may be omitted. The fifth rotational movement axis O5 may be parallel to the axis which is perpendicular to the fourth rotational movement axis O4, and the axial directions of the fifth rotational movement axis O5 and the fourth rotational movement axis O4 may differ from each other even if the axial direction of the fifth rotational movement axis O5 is not perpendicular to that of the fourth rotational movement axis O4.

The fifth arm 16 and the sixth arm 17 are connected via a joint (a connecting portion) 176. The joint 176 includes a mechanism which supports the fifth arm 16 and the sixth arm 17 which are connected to each other such that one is capable of rotational movement with respect to the other. Accordingly, the sixth arm 17 is capable of rotational movement centered on the sixth rotational movement axis O6 (around the sixth rotational movement axis O6) with respect to the fifth arm 16. The sixth rotational movement axis O6 is perpendicular to the fifth rotational movement axis O5. The rotational movement around the sixth rotational movement axis O6 is carried out through the driving of the sixth drive source 406. The sixth drive source 406 is driven by a motor 406M and a cable (not illustrated) and the motor 406M is controlled by the control unit 7 (the control device 71) via a motor driver 306 which is electrically connected. The sixth drive source 406 may be configured to transmit the driving force from the motor 406M using a decelerator (not illustrated) which is provided with the motor 406M, and the decelerator may be omitted. The sixth rotational movement axis O6 may be parallel to the axis which is perpendicular to the fifth rotational movement axis O5, and the axial directions of the sixth rotational movement axis O6 and the fifth rotational movement axis O5 may differ from each other even if the axial direction of the sixth rotational movement axis O6 is not perpendicular to that of the fifth rotational movement axis O5.

The robot 1 which performs such driving is capable of performing various work such as transporting precision equipment and components by controlling the operations of the arms 12 to 17 and the like while holding the transporting precision equipment and components using the hand 91 which is connected to the distal end portion of the sixth arm 17. The driving of the hand 91 is controlled by the control unit 7 (the control device 71).

Since the robot 1 is a vertical multi-jointed (six axes) robot having six arms, the driving range is wide and the robot 1 has high working properties.

As described earlier, the robot 1 hangs down from the ceiling portion 53 via the attachment plate 57 and the joint 171 which is the connecting portion between the base 11 and the first arm 12 is positioned vertically above the joint 172 which is the connecting portion between the first arm 12 and the second arm 13. Therefore, it is possible to further widen the working range of the robot 1 on the work surface 551 which is positioned vertically below the robot 1. Therefore, for example, it is possible to effectively use the work surface 551 in comparison with a case in which the robot 1 is attached to the work surface 551.

In the illustrated configuration, the motor drivers 301 to 306 are disposed on the base 11; however, the configuration is not limited thereto and the motor drivers 301 to 306 may be disposed on the robot control device, for example.

Hereinabove, a simple description is given of the configuration of the robot 1.

Next, a description will be given of the relationships between the arms 12 to 17 with reference to FIGS. 8 to 10E and the description will be given from various viewpoints changing expressions and the like. With respect to the third arm 14, the fourth arm 15, the fifth arm 16, and the sixth arm 17, consideration will be given to a state in which the arms are extended straight, that is, as illustrated in FIGS. 8 and 9, a state in which the fourth rotational movement axis O4 and the sixth rotational movement axis O6 match or are parallel.

As illustrated in FIG. 8, a length L1 of the first arm 12 is set to be longer than a length L2 of the second arm 13.

Here, as viewed from the axial direction of the second rotational movement axis O2, the length L1 of the first arm 12 is a distance between the second rotational movement axis O2 and a center line 611 which extends in the left-right direction in FIG. 8 of a bearing unit 61 (a member included in the joint 171) which supports the first arm 12 in a rotationally movable manner. As viewed from the axial direction of the second rotational movement axis O2, the length L2 of the second arm 13 is a distance between the second rotational movement axis O2 and the third rotational movement axis O3.

As illustrated in FIG. 9, as viewed from the axial direction of the second rotational movement axis O2, the robot 1 is configured such that it is possible to set an angle θ between the first arm 12 and the second arm 13 to 0°. In other words, as viewed from the axial direction of the second rotational movement axis O2, the robot 1 is configured such that it is possible for the first arm 12 and the second arm 13 to overlap. The second arm 13 is configured such that the second arm 13 does not interfere with the second portion 122 of the first arm 12 or the ceiling portion 53 in a case in which the angle θ is 0°, that is, in a case in which the first arm 12 and the second arm 13 overlap as viewed from the axial direction of the second rotational movement axis O2.

Here, as viewed from the axial direction of the second rotational movement axis O2, the angle θ between the first arm 12 and the second arm 13 is the angle between a straight line (the center axis of the second arm 13 in a case of being viewed from the axial direction of the second rotational movement axis O2) 621 which passes through the second rotational movement axis O2 and the third rotational movement axis O3 and the first rotational movement axis O1 (refer to FIG. 8).

As illustrated in FIG. 9, the robot 1 is configured such that it is possible for the second arm 13 and the third arm 14 to overlap as viewed from the axial direction of the second rotational movement axis O2. In other words, as viewed from the axial direction of the second rotational movement axis O2, the robot 1 is configured such that it is possible for the first arm 12, the second arm 13, and the third arm 14 to overlap at the same time.

A length L3 of the total of the third arm 14, the fourth arm 15, the fifth arm 16, and the sixth arm 17 is set to be longer than the length L2 of the second arm 13. Accordingly, as viewed from the axial direction of the second rotational movement axis O2, when the second arm 13 and the third arm 14 overlap, it is possible to cause the distal end of the robot arm 10, that is, the distal end of the sixth arm 17 to protrude from the second arm 13. Accordingly, it is possible to prevent the hand 91 from interfering with the first arm 12 and the second arm 13.

Here, the length L3 of the total of the third arm 14, the fourth arm 15, the fifth arm 16, and the sixth arm 17 is a distance between the third rotational movement axis O3 and the distal end of the sixth arm 17 as viewed from the axial direction of the second rotational movement axis O2 (refer to FIG. 9). In this case, the third arm 14, the fourth arm 15, the fifth arm 16, and the sixth arm 17 are in a state such as the one illustrated in FIG. 9 in which the fourth rotational movement axis O4 and the sixth rotational movement axis O6 match or are parallel.

As illustrated in FIGS. 10A-10E, by rotationally moving the second arm 13 without rotationally moving the first arm 12, the robot 1 is capable of causing the distal end of the second arm 13 to move to a position which is 180° different around the first rotational movement axis O1 via a state in which the angle θ is 0° as viewed from the axial direction of the second rotational movement axis O2. Therefore, it is possible to cause the distal end (the distal end of the sixth arm 17) of the robot arm 10 to move from a position (a first position) illustrated in FIG. 10A, via a state in which the first arm 12 and the second arm 13 overlap as illustrated in FIG. 10C, and to cause the distal end of the robot arm 10 to move to a position (a second position) illustrated in FIG. 10E which is different by 180° around the first rotational movement axis O1 from the position illustrated in FIG. 10A. During the movement, each of the third arm 14, the fourth arm 15, the fifth arm 16, and the sixth arm 17 is rotationally moved as necessary.

It is possible for the robot 1, as illustrated in FIG. 11, to cause the hand 91 to move to a position which is 180° different around the first rotational movement axis O1 using the driving of the robot arm 10 by performing an operation which causes the hand 91 to move as illustrated by an arrow 66 without performing an operation which causes the hand 91 to move as illustrated by arrows 67 and 68. In other words, as viewed from the axial direction of the first rotational movement axis O1, the robot 1 is capable of causing the hand 91 to move to a position which is 180° different around the first rotational movement axis O1 by performing an operation which causes the hand 91 (the distal end of the robot arm 10) to move on a straight line. Accordingly, since it is possible to reduce the size of the space for ensuring that the robot 1 does not interfere, it is possible to obtain a reduction in the size of the cell 5. Therefore, it is possible to render the area (the installation area) of the installation space for installing the cell 5, that is, an area S in plan view as viewed from the vertical direction of the cell 5 smaller than that of the related art.

Specifically, it is preferable that the area S is less than 637,500 mm$^2$, it is more preferable that the area S is less than or equal to 500,000 mm$^2$, it is yet more preferable that the area S is less than or equal to 400,000 mm$^2$, and it is particularly preferable that the area S is less than or equal to 360,000 mm$^2$. As described earlier, since the robot 1 is capable of performing the operations, it is possible to drive the robot arm 10 so as not to interfere with the cell 5 even the area S is as described.

In particular, the area S which is less than or equal to 400,000 mm$^2$ is approximately the same as or less than or equal to the same as the size of the work region in which a human (a worker) works. Therefore, when the area S is less than the upper limit value, for example, it is possible to easily perform an exchange between a human and the robot cell 50. It is also possible to easily perform the opposite change, that is, changing the robot cell 50 for a human. Therefore, for example, in a case in which a human and the robot cell 50 are exchanged to change the manufacturing line, it is possible to easily perform the change. It is also possible to easily perform the opposite change, that is, changing the robot cell 50 for a human. It is preferable that the area S is greater than or equal to 10,000 mm². Accordingly, it is possible to simplify the maintenance of the inner portion of the robot cell 50.

By reducing the size of the area S, as illustrated in FIG. 11, it is possible to reduce a width W1 of the cell 5 in the Y-axis direction to less than the size of a width WX of the related art, specifically, for example, it is possible to render the width W1 less than or equal to 80% of the width WX of the related art.

Specifically, it is preferable that the width W1 is less than 850 mm, it is more preferable that the width W1 is less than 750 mm, and it is yet more preferable that the width W1 be less than or equal to 650 mm (refer to FIG. 11). Accordingly, it is possible to sufficiently exhibit the same effect as the above-described effect. The width W1 is the average width of the cell 5. It is preferable that the width W1 is greater than or equal to 100 mm. Accordingly, it is possible to simplify the maintenance of the inner portion of the robot cell 50.

In the present embodiment, the cell 5 has a square shape in plan view. Therefore, in the present embodiment, the width (the depth) W1 of the cell 5 in the Y-axis direction (the up-down direction in FIG. 11) and the width (the horizontal width) W2 of the cell 5 in the X-axis direction (the left-right direction in FIG. 11) are the same. The width W1 and the width W2 may be different.

As illustrated in FIGS. 10A-10E, in the robot 1, since an operation which causes the distal end of the second arm 13 to move to a position which is different by 180° around the first rotational movement axis O1 without rotationally moving the first arm 12, it is possible to cause the hand 91 to move without substantially changing the height (the position in the vertical direction) of the distal end of the robot arm 10 (maintaining the height at a substantially fixed level). Therefore, it is possible to render the height (the length in the vertical direction) L of the cell 5 lower than the height of the related art (refer to FIG. 2). Specifically, it is possible to render the height L of the cell 5 less than or equal to 80% of the related art, for example. Accordingly, it is possible to lower the ceiling surface 531, and thus it is possible to lower the position of the center of gravity of the robot 1. Therefore, it is possible to reduce the oscillation which is generated by the operation of the robot 1.

Specifically, it is preferable that the height L is less than or equal to 1,700 mm, and it is more preferable that the height L is greater than or equal to 1,000 mm and less than or equal to 1,650 mm. When the height L is less than or equal to the upper limit value, it is possible to yet further suppress the influence of oscillation when the robot 1 operates in the cell 5. When the height L is greater than or equal to the lower limit value, it is possible to avoid the robot 1 interfering with the work surface 551, for example. The height L is the average height of the cell 5 (including the foot portion 54).

When an operation which causes the hand 91 (the distal end of the robot arm 10) of the robot 1 to move to a position which is different by 180° around the first rotational movement axis O1 is to be executed by simply rotationally moving the first arm 12 around the first rotational movement axis O1 as in the robot of the related art, since there is a concern that the robot 1 will interfere with the cell 5 or the peripheral devices, it is necessary to teach retreat points for avoiding the interference to the robot 1. For example, in a case in which the robot 1 interferes with the support columns 51 and the like of the cell 5 when only the first arm 12 is rotated by 90° around the first rotational movement axis O1, it is necessary to teach the retreat points so as not to interfere with the support columns 51 and the like by also rotationally moving the other arms. Similarly, in a case in which the robot 1 also interferes with peripheral devices, it is necessary to further teach retreat points so as not to interfere with the peripheral devices. In the robot of the related art, it is necessary to teach multiple retreat points, in particular, in the case of a small cell, a large number of retreat points are necessary and much labor and a long time are necessary for the teaching.

In comparison, in the robot 1, in a case in which the operation which causes the hand 91 to move to a position which is 180° different around the first rotational movement axis O1 is executed, since the regions and portions in which there is a concern of interference become extremely few, it is possible to reduce the number of retreat points to be taught and it is possible to reduce the labor and the time necessary for the teaching. In other words, in the robot 1, the number of retreat points to be taught becomes, for example, approximately ⅓ of that of the robot of the related art and the teaching becomes markedly easier.

In the robot 1 of the above-described configuration, a region (a portion) 105 of the third arm 14 and the fourth arm 15 which is surrounded by a two-dot chain line of the right side in FIG. 6 is a region (a portion) in which the robot 1 either does not interfere with or does not easily interfere with the robot 1 itself and the other members. Therefore, in a case in which a predetermined member is mounted in the region 105, the member does not easily interfere with the robot 1, the peripheral devices, and the like. Therefore, in the robot 1, it is possible to mount a predetermined member in the region 105. In particular, in a case in which the predetermined member is mounted in the region of the right side of the third arm 14 in FIG. 6 inside the region 105, this is more effective since the probability of the member interfering with the peripheral devices (not illustrated) which are disposed on the work portion 55 is further reduced.

Examples of members which may be mounted in the region 105 include a control device which controls the driving of the hand and sensors such as a hand eye camera, an electromagnetic valve of an adherence mechanism, and the like.

As a specific example, for example, in a case in which an adherence mechanism is provided in the hand, when an electromagnetic valve or the like is installed in the region 105, the electromagnetic valve is not a hindrance when the robot is driven. In this manner, the region 105 is highly convenient.

Transport Unit As illustrated in FIGS. 1 to 5, 12, 13 and 14B, the transport unit 3 includes a first transporter (a transporter) 31 which extends in the X-axis direction, a second transporter (a transporter) 32 which extends in the Y-axis direction which is a direction perpendicular to the direction in which the first transporter 31 extends, a third transporter (a transporter) 33 which is provided above the second transporter 32, a component supply unit 34, and a drive unit 35 which drives the transporters 31, 32, and 33. In FIGS. 1 to 5, 12, 13, and 14B, the parts included in the transport unit 3 are schematically illustrated, and the illustration of support feet and the like which support each of the first transporter 31, the second transporter 32, and the third transporter 33 with respect to the work portion 55 is omitted. In FIGS. 12 and 13, the illustration of the drive unit 35 is omitted.

As illustrated in FIG. 12, the first transporter 31 is provided closer to the fourth side surface portion 584 side than the base 11 of the robot 1 in plan view. The first transporter 31 is provided to pass through the first side surface portion 581 and the third side surface portion 583. In other words, a portion of the first transporter 31 is positioned in the inner portion (the first space S1) of the cell 5 and the remaining portion of the first transporter 31 is positioned in the outer portion to the cell 5.

The first transporter 31 is configured by a transport device such as a belt conveyor and includes two parallel belts 311 and two rollers 312 and 313 (refer to FIGS. 3 and 12). As illustrated in FIG. 13, it is possible to dispose a jig 371 on which a component 41 is mounted on the top portions of the belts 311 and the first transporter 31 is capable of transporting the jig 371 in the +X-axis direction illustrated by an arrow A1 in FIG. 13 due to the belts 311 being driven (running).

A rotational support jig 315 which rotates the jig 371 by 90° in the X-Y plane is provided on the first transporter 31 in the vicinity of the second transporter 32. The rotational support jig 315 is used when transporting the jig 371 on the first transporter 31 to the second transporter 32.

As illustrated in FIG. 12, the second transporter 32 is provided closer to the third side surface portion 583 side than the base 11 of the robot 1 in plan view. The second transporter 32 is provided to pass through the second side surface portion 582. In other words, one end portion of the second transporter 32 is positioned in the inner portion (the first space S1) of the cell 5 and the other end portion of the second transporter 32 is positioned in the outer portion to the cell 5. In the second transporter 32, the one end portion which is positioned inside the cell 5 is provided in the vicinity of the first transporter 31.

The second transporter 32 is configured by a transport device such as a belt conveyor and includes two parallel belts 321 and two rollers 322 and 323 (refer to FIGS. 4, 5, and 12). As illustrated in FIG. 13, it is possible to dispose the jig 371 from the first transporter 31 on the top portions of the belts 321 and the jig 371 is transported in the −Y-axis direction (a direction from the inner portion of the cell 5 toward the outer portion of the cell 5) illustrated by an arrow A2 in FIG. 13 due to the belts 321 being driven (running).

As illustrated in FIG. 14B, an installation height L32 of the second transporter 32 with respect to the work surface 551 is higher than an installation height L31 of the first transporter 31 with respect to the work surface 551.

As illustrated in FIGS. 12 and 13, a bar 325 having a portion extending in the X-axis direction is provided on the one end portion of the first transporter 31 side of the second transporter 32. The portion of the bar 325 which extends in the X-axis direction is capable of moving in the Y-axis direction and is used for pulling the component 41 on the first transporter 31 into the second transporter 32.

As illustrated in FIG. 12, the third transporter 33 extends in the Y-axis direction which is the same direction as the direction in which the second transporter 32 extends. The length (the length in the Y-axis direction) in the direction in which the third transporter 33 extends is shorter than the length in the direction in which the second transporter 32 extends. The second transporter 32 is positioned in the inner portion (the first space S1) of the cell 5.

The third transporter 33 is configured by a transport device such as a belt conveyor and includes two parallel belts 331 and two rollers 332 and 333 (refer to FIGS. 4, 5, and 12). It is possible to dispose the jig 371 on the top portions of the belts 331 and the jig 371 is transported in the +Y-axis direction (a direction from the outer portion of the cell 5 toward the inner portion of the cell 5) illustrated by an arrow A3 in FIG. 13 due to the belts 331 being driven (running).

As illustrated in FIG. 14B, an installation height L33 of the third transporter 33 with respect to the work surface 551 is higher than the installation height L32 of the second transporter 32 with respect to the work surface 551. Therefore, in the present embodiment, the first transporter 31, the second transporter 32, and the third transporter 33 satisfy a relationship of installation height L31<installation height L32<installation height L33.

As illustrated in FIG. 12, the component supply unit 34 is provided closer to the first side surface portion 581 side than the base 11 of the robot 1 in plan view. For example, it is possible to mount a component 42 or the like which is embedded in the component 41 on the component supply unit 34.

As illustrated in FIG. 1, the drive unit 35 is provided on the outer portion of the third side surface portion 583 side of the cell 5. For example, the drive unit 35 includes a drive source 351 such as a motor and a motive power transmission mechanism 352 which transmits the motive power of the drive source 351 to the transporters 31, 32, and 33. The driving of the drive unit 35 is controlled by the control unit 7 (the control device 71).

As illustrated in FIGS. 1 and 3, the motive power transmission mechanism 352 includes a shaft 353 which rotates around an axis (around the Y axis) due to the drive source 351, and a first motive power transmission unit 354 and a second motive power transmission unit 355 which are connected to the shaft 353.

The first motive power transmission unit 354 illustrated in FIG. 3 transmits the motive force which is transmitted to the shaft 353 to the first transporter 31 and drives the belts 311 of the first transporter 31 in the same direction as the rotation direction of the shaft 353. The second motive power transmission unit 355 illustrated in FIG. 1 transmits the motive power which is transmitted to the shaft 353 to the second transporter 32 and the third transporter 33. The second motive power transmission unit 355 converts the rotation axis by 90° with respect to the axis of the shaft 353 and drives the belts 321 of the second transporter 32 and the belts 331 of the third transporter 33.

It is possible to drive the three transporters 31, 32, and 33 using the single drive unit 35. Therefore, since it is possible to reduce the number of drive units in comparison with a case in which the drive units are provided for each of the transporters 31, 32, and 33, it is possible to further reduce the size of the space in which the robot system 100 is installed.

In the transport unit 3, as described previously, the transporters 31, 32, and 33 each include portions which are installed in the inner portion of the cell 5. Therefore, in comparison with a case in which the transporters 31, 32, and 33 are provided on the outer portion of the cell 5, it is possible to further reduce the size of the space in which the robot system 100 is installed.

As illustrated in FIG. 12, it is preferable that a separation distance D31 in plan view between a center line A31 along the extending direction of the first transporter 31 and the first rotational movement axis O1 of the robot 1, and the width W1 of the cell 5 satisfy a relationship of $0.1 \leq D31/W1 < 0.5$, it is more preferable that the separation distance D31 and the width W1 satisfy a relationship of 0.15≤D31/W1<0.4, and it is yet more preferable that the separation distance D31 and the width W1 satisfy a relationship of 0.2≤D31/W1<0.3. Accordingly, it is possible to store most portions of the first transporter 31 inside the cell 5 and it is possible to sufficiently secure the space in which to install the second transporter 32 and the third transporter 33 other than the first transporter 31 inside the cell 5.

Specifically, it is preferable that the separation distance D31 is greater than or equal to 0 mm and less than or equal to 300 mm, and it is more preferable that the separation distance D31 is greater than or equal to 100 mm and less than or equal to 200 mm. Accordingly, it is possible to notably exhibit the previously-described effects.

Positioning Unit

As illustrated in FIGS. 12 and 13, the positioning unit 90 is provided at the center portion of the first transporter 31 in the X-axis direction. The positioning unit 90 is used for defining the position of the jig 371 (the component 41) with respect to the robot 1.

As illustrated in FIGS. 14A and 14B, the positioning unit 90 includes a seat 901 which is fixed to the work surface 551, a plate-shaped support portion 902 which is provided on the seat 901, and two positioning pins 903 which are provided on the support portion 902.

As illustrated in FIG. 14A, the support portion 902 is provided to be positioned between the two belts 311 of the first transporter 31 in plan view. The two positioning pins 903 are provided separated from each other to line up in the X-axis direction. The two positioning pins 903 are configured to protrude vertically upward, or conversely, to retreat (retreat inside the support portion 902) vertically downward by the control unit 7 (the control device 71) which is described later. Meanwhile, holes 372 corresponding to the positioning pins 903 which penetrate in the vertical direction are formed in the jig 371. As illustrated in FIG. 14 B, in the positioning unit 90, when the jig 371 is transported to above the positioning unit 90 by the first transporter 31, according to the instructions of the control unit 7 (the control device 71), the transporting of the first transporter 31 stops and the positioning pins 903 protrude so as to pass through the holes 372 which are included in the jig 371. Accordingly, the jig 371 stops above the positioning unit 90 and the positioning with respect to the robot 1 is performed.

A configuration may be adopted in which the support portion 902 moves vertically upward (the +Z-axis direction) together with the positioning pin 903, and a configuration may be adopted in which the jig 371 lifts up to above the first transporter 31 due to the support portion 902 moving vertically upward.

Here, for example, in a case in which the positioning unit 90 is provided on the outer portion of the cell 5, work of installing the cell 5 such that the robot 1 is positioned at an appropriate position with respect to the positioning unit 90 is necessary. In response, in the present embodiment, since the relative positions of the positioning unit 90 and the robot 1 are fixed due to the positioning unit 90 being provided on the inner portion of the cell 5, it is possible to omit the work. Therefore, it is possible to easily perform the relocation of the cell 5.

Since the positioning unit 90 is provided on the inner portion of the cell 5, it is possible to further reduce the size of the robot system 100 in comparison with a case in which the positioning unit 90 is provided on the outer portion of the cell 5.

Imaging Unit As illustrated in FIG. 13, two of the imaging units 36 are provided on the work surface 551. The imaging units 36 are provided on the +Y axis side and the −Y axis side of the positioning unit 90 in plan view. The two imaging units 36 are provided to deviate with respect to the transport direction of the first transporter 31.

Each of the two imaging units 36 includes an electronic camera 361 and a prism 362. The electronic camera 361 is disposed facing upward. The prism 362 is disposed above the electronic camera 361. The prism 362 refracts the reflected light from the component 42 and points the reflected light toward the electronic camera 361.

Here, it is necessary to secure an optical path length of a predetermined length between the component 41 which is the object and the imaging unit 36; however, as long as the imaging unit 36 is configured as described above, it is possible to install the imaging unit 36 even in a case in which the length in the Y-axis direction is small.

The imaging unit 36 is used for checking (inspecting) whether or not the component 42 is accurately embedded in the component 41 on the jig 371 which is mounted on the positioning unit 90. The imaging unit 36 is used for detecting the position of the jig 371 with respect to the positioning unit 90 and controlling the driving of the positioning unit 90 using the control device 71 based on the detection results. The imaging unit 36 is also used for detecting the position of the hand 91 with respect to the positioning unit 90 and controlling the position of the hand 91 using the control device 71 based on the detection results.

Since the two imaging units 36 are provided in the vicinity of the positioning unit 90, it is possible to perform the inspecting while the component 41 is being transported by the first transporter 31. Therefore, it is possible to further shorten the tact time.

In the present embodiment, the number of the imaging units 36 is two; however, the number of imaging units may be one and may be greater than or equal to three.

Control Unit As illustrated in FIGS. 2 to 5, the control unit 7 includes the control device 71 which controls the parts which are included in the robot system 100, two lighting power devices 74 which supply power to lighting (not illustrated) which is provided inside the cell 5, a power device 72 which supplies power to the parts of the robot system 100 excluding the lighting, an uninterruptible power supply (UPS) 73, a computer 75 which outputs instructions to the control device 71, and a wiring unit (a power device) 76 which is connected to the devices of the control unit 7.

The control device 71 is provided on the base portion 52 and is positioned on the first side surface portion 581 side of the second space S2. The power device 72 is provided on the base portion 52 and is positioned on the third side surface portion 583 side in the second space S2. The uninterruptible power supply 73 is provided on the base portion 52 and is provided between the control device 71 and the power device 72. The two lighting power devices 74 are provided on the uninterruptible power supply 73. The computer 75 is provided above the control device 71 and the lighting power device 74. The computer 75 is installed so as to fit inside a box-shaped support portion 80 which hangs down from the reverse surface of the work portion 55. The support portion 80 is opened on the second side surface portion 582 side and it is possible to insert and remove the computer 75 with respect to the support portion 80 from the second side surface portion 582 side which is open.

The wiring unit 76 is attached to the reverse surface of the work portion 55. The devices of the control unit 7 are electrically connected to the wiring unit 76 and are connected to a cable (wiring) which is passed through the gap 56 and the wiring duct 59 from the wiring unit 76.

The control unit 7 is provided in the second space S2 which is vertically lower than the work portion 55. Therefore, since it is possible to lower the center of gravity of the cell 5, it is possible to reduce the concern that the cell 5 will fall over. Accordingly, since it is possible to stabilize the posture of the cell 5, it is possible to stabilize the driving of the robot 1. In the present embodiment, the devices which are included in the control unit 7 are stored in the inner portion of the cell 5; however, at least a portion of the devices may be provided on the outer portion of the cell 5. However, due to the devices being stored in the inner portion of the cell 5, it is possible to exhibit the effect more notably.

The robot 1 is provided in the first space S1 which is vertically above the work surface 551 with respect to the control unit 7. As described above, since it is possible to render the center of gravity of the cell 5 low due to the control unit 7 being provided vertically below the work portion 55, it is possible to more stably drive the robot 1 which is provided vertically above the work portion 55.

In the control unit 7, in addition to the control of the robot 1, the driving of the transporters 31, 32, and 33, the positioning unit 90, the drive unit 35, and the two imaging units 36 is controlled by the control device 71. Therefore, it is possible to reduce the overall size of the robot system 100 in comparison to a case in which devices controlling the parts are provided individually.

Here, as described earlier, safety plates are installed on the portions overlooking the second space S2 of the first side surface portion 581, the third side surface portion 583, and the fourth side surface portion 584, whereas safety plates are not provided on the portions overlooking the second space S2 of the second side surface portion 582. Therefore, it is possible to insert and remove each of the control device 71, the power device 72, the uninterruptible power supply 73, and the two lighting power devices 74 from the second side surface portion 582 side of the cell 5. Since it is possible to insert and remove the devices from the second side surface portion 582 which is different from the first side surface portion 581 and the third side surface portion 583 through which the first transporter 31 passes, for example, when performing maintenance on the devices, it is possible to more easily insert and remove the devices without the first transporter 31 becoming a hindrance. Therefore, it is possible to more easily and more swiftly perform the maintenance.

The number of devices with which the control unit 7 is provided is not limited to the illustrated number and is arbitrary. For example, in the present embodiment, two of the lighting power devices 74 are provided; however, there may be one the lighting power device and there may be greater than or equal to three lighting power devices. The arrangement of the devices is not limited to the arrangement which is illustrated. The arrangement of the wiring and the like which connects the devices to the robot 1 is also not limited to the above-described configuration and is arbitrary. Display Operation Unit As illustrated in FIG. 1, the display operation unit 70 is provided on the top portion of the second side surface portion 582 of the cell 5. The display operation unit 70 is attached to the cell 5 via a flexible arm 702. The display operation unit 70 includes a monitor 701 and it is possible to check the driving state and the like of the parts which are included in the robot system 100 on the monitor 701. The monitor 701 is a touch panel and a worker (a human) is capable of instructing the control unit 7 via the display operation unit 70.

The display operation unit 70 may be provided at a location other than the one illustrated. In the present embodiment, there is one display operation unit 70; however, the number of display operation units is not limited thereto and there may be a plurality of display operation units. For example, the display operation unit may be configured by a monitor in which the driving state and the like of the parts is checked and a mouse or the like with which the screens which are displayed on the monitor are operated.

Gas Supply Unit As illustrated in FIG. 1, the gas supply unit 60 is provided on the top portion of the ceiling portion 53. The robot system 100 includes a gas supply device (not illustrated) which is provided separately from the robot cell 50, pneumatic piping 65 which is illustrated in FIG. 3, piping (not illustrated) which connects the gas supply device and the pneumatic piping 65, and piping (not illustrated) which is inserted through the gap 56 and the wiring duct 59 from the pneumatic piping 65 and is connected to the gas supply unit 60.

The gas supply unit 60 includes an air filter 62 which removes dust and the like from a gas which is supplied to obtain a gas (clean gas) with high cleanliness (degree of cleanness), and a fan 63 which is provided upstream of the air filter 62.

In the gas supply unit 60, a gas which is supplied via the pneumatic piping 65 from the gas supply device is blown by the fan 63, and the gas which is blown by the fan 63 passes through the air filter 62 to become a gas with high cleanliness. The gas supply unit 60 is provided on the ceiling portion 53 and is configured to blow the gas with high cleanliness vertically downward from the gas supply unit 60. Therefore, since it is possible to efficiently discharge the dust and the like in the air inside the first space S1 through a discharge portion (not illustrated) to the outer portion, it is possible to further increase the cleanliness inside the first space S1.

For the cleanliness inside the first space S1, there are no particular limitations; however, it is preferable to adopt a higher cleanliness than class 10000 which is defined in US federal standard (FED-STD-209).

In the previously-described description, the gas supply unit 60 is provided on the top portion of the ceiling portion 53; however, the arrangement of the gas supply unit is not limited thereto, and for example, the gas supply unit may be provided inside the first space S1.

Hereinabove, a description is given of the parts which configure the robot system 100.

Next, a description will be given of an example of the work in the robot system 100 with reference to FIG. 13.

Here, a description will be given of work in which, in a case in which the component 42 is embedded in the component 41 by the robot 1, and after checking (inspecting) whether or not the embedding is carried out correctly, in a case in which the embedding is not carried out accurately, the embedding of the component 42 is performed again.

First, the first transporter 31 transports the component 41 which is mounted on the jig 371 in the direction of the arrow A1 (the +X-axis direction) in FIG. 13 and mounts the component 41 on the positioning unit 90.

Next, the robot 1 rotationally moves the robot arm 10, grips the component 42 which is mounted on the component supply unit 34 using the hand 91, transports and disposes the component 42 which is gripped on the component 41.

Next, the imaging unit 36 is used to inspect whether or not the component 42 is accurately embedded in the component 41. Next, in a case in which the component 42 is not accurately embedded (is defective), the first transporter 31 transports the jig 371 from the positioning unit 90 to the rotational support jig 315. Subsequently, the rotational support jig 315 rotates the jig 371 by 90° in the X-Y plane. Next, the bar 325 pulls the jig 371 from the first transporter 31 to the second transporter 32. Accordingly, the component 41 is transported to the second transporter 32. In a case in which the component is accurately embedded in the component 41 (is non-defective), the first transporter 31 transports the component 41 in the arrow A1 direction in FIG. 13 and transports the component 41 to the outer portion of the cell 5.

Next, the second transporter 32 transports the component 41 which is defective to in the arrow A2 direction (the −Y-axis direction) in FIG. 13 and discharges the component 41 to the outer portion of the cell 5. In this manner, it is possible to utilize the second transporter 32 as a transporter which discharges the components 41 which are defective.

Next, a worker (a human), for example, embeds the component 42 again in the component 41 which is discharged. Subsequently, the worker mounts the component 41 which is non-defective on the third transporter 33. In this manner, it is possible to utilize the third transporter 33 as a transporter which transports the components 41 which are non-defective.

Next, the third transporter 33 transports the component 41 in the arrow A3 direction (the +Y-axis direction) in FIG. 13 and transports the component 41 to the first transporter side of the third transporter 33. Next, the robot 1 rotationally moves the robot arm 10, grips the component 41 which is mounted on the third transporter 33 using the hand 91, and transports and disposes the component 41 which is gripped on the first transporter 31. The first transporter 31 transports the component 41 in the arrow A1 direction in FIG. 13 and transports the component 41 to the outer portion of the cell 5.

Hereinabove, a description is given of an example of work which uses the robot system 100.

Here, as described earlier, the robot system 100 includes the transporters 31, 32, and 33 in addition to the robot 1. Therefore, in the work, the robot 1 is capable of performing other work while in the middle of transporting the components using the transporters 31, 32, and 33. Accordingly, compared to a case in which the transporters 31, 32, and 33 are not included, it is possible to shorten the tact time of the overall robot system 100.

Due to the second transporter 32 and the third transporter 33 which have different transport directions from the first transporter 31 being included, it is possible to transport the component 41 which is defective in a different direction from the component 41 which is non-defective. Therefore, in a case in which the component 41 which is defective arises, it is possible to continue transporting the next component 41 at any time without stopping the driving of the first transporter 31. Therefore, it is possible to further shorten the tact time of the overall robot system 100.

As described earlier, the transporters 31, 32, and 33 satisfy the relationship of installation height L31<installation height L32<installation height L33. Therefore, it is possible to more easily transport the component 41 from the first transporter 31 to the second transporter 32. According to the robot 1, it is possible to more easily transport the component 41 from the third transporter 33 to the first transporter 31. Therefore, it is possible to further shorten the tact time.

The work of the robot system 100 is an example, and the robot system 100 is capable of performing various work other than the work which is described above. For example, in the description which is given earlier, the worker performs work of embedding the component 42 again in the component 41 which is discharged and mounting the component 41 in which the component 42 is embedded on the third transporter 33; however, the work may be performed by the robot 1 without the mediation of the worker. In other words, for example, the robot 1 may re-embed the component 42 in the component 41 which is defective using the third transporter 33 and transport the component 41 which is non-defective to the first transporter 31. Subsequently, the inspection of the component 41 which is once more a non-defective component may be performed by the positioning unit 90.

Second Embodiment

Figure 15:
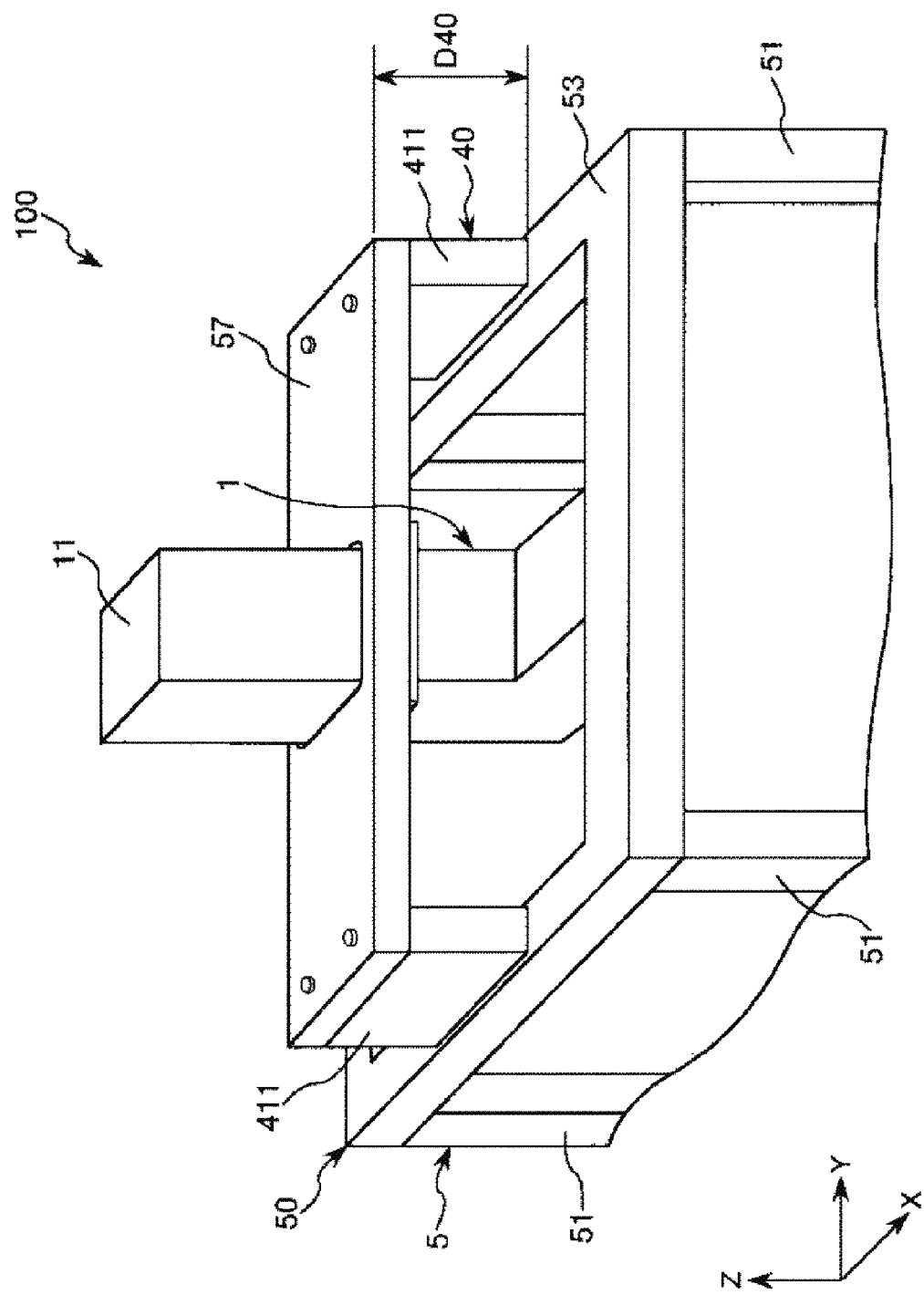
FIG. 15 is a diagram illustrating a second embodiment of a robot system according to the invention.

FIG. 15 is a diagram illustrating the second embodiment of a robot system according to the invention. In FIG. 15, the illustration of the gas supply unit and the display operation unit is omitted.

Hereinafter, a description will be given of the second embodiment with reference to the drawings; however, the description will be given centered on the points of difference with the above-described embodiment, omitting the description of items which are the same.

In the robot system of the present embodiment, a changing mechanism is included which differs from that of the first embodiment.

The robot system 100 which is illustrated in FIG. 15 includes a changing mechanism 40 which changes the installation height of the robot 1 with respect to the cell 5. The changing mechanism 40 includes two spacers 411 which are provided between the ceiling portion 53 and the attachment plate 57 of the cell 5. By attaching the spacers 411, it is possible to change a separation distance D40 between the base 11 and the cell 5. Accordingly, for example, in a case in which the heights of the transporters 31, 32, and 33 are to be changed, it is possible to respond by attaching the spacers 411 corresponding to the height to be changed. Therefore, the configuration of the entirety of the cell 5 need not be redesigned.

The attachment method of the spacers 411 to the ceiling portion 53 is not particularly limited, for example, it is possible to adopt an attachment method or the like which uses a plurality of bolts. The number, the arrangement, and the shape of the spacers 411 are not limited to those which are illustrated. For example, the number of the spacers 411 may be one and may be greater than or equal to three. For example, a plurality of the spacers 411 may be stacked along the vertical direction. For example, the spacers 411 may be frame bodies which form a quadrilateral shape in plan view. For example, the changing mechanism 40 is not limited to a configuration which includes the spacers 411, and, for example, may be configured to include a support tool (not illustrated) which supports the attachment plate 57, and a movement mechanism (not illustrated) which causes the support tool to move in the vertical direction.

Even according to the second embodiment, it is possible to achieve the same effect as in the first embodiment.

Third Embodiment

Figure 16A:
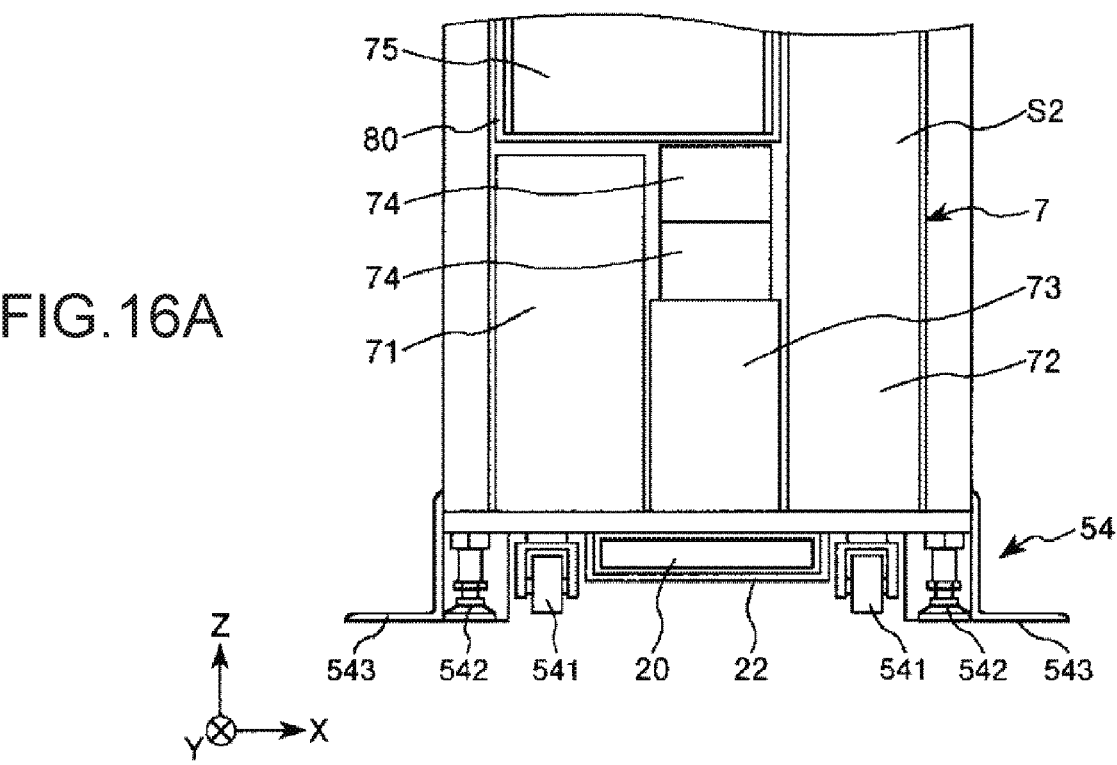
FIGS. 16A and 16B are diagrams illustrating a third embodiment of a robot system according to the invention.
Figure 16B:
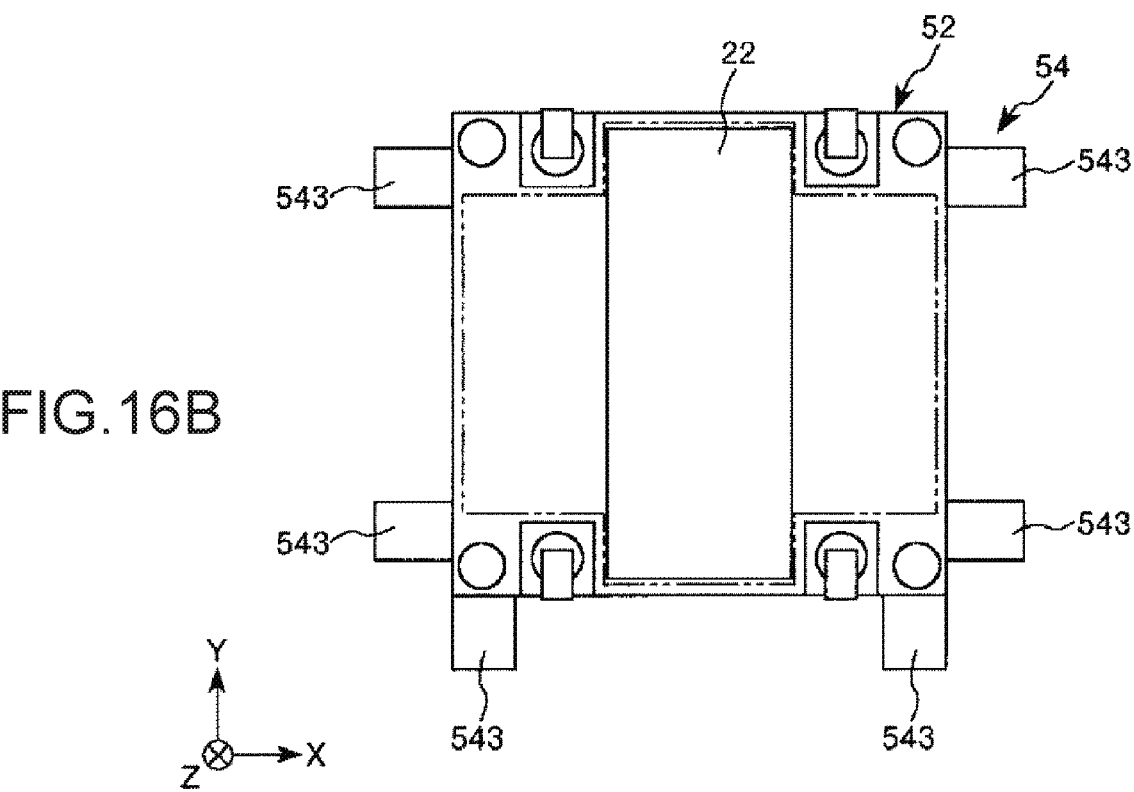

FIGS. 16A and 16B are diagrams illustrating the third embodiment of a robot system according to the invention. FIG. 16A is a front view and FIG. 16B is a bottom view.

Hereinafter, a description will be given of the third embodiment with reference to the drawings; however, the description will be given centered on the points of difference with the above-described embodiments, omitting the description of items which are the same.

In the robot system of the present embodiment, a configuration is adopted such that it is possible to provide a weight and this is different from the first embodiment.

In the robot system 100 which is illustrated in FIG. 16A, a box-shaped support portion 22 which hangs down from the reverse surface of the base portion 52 is attached below the base portion 52 of the cell 5. The second side surface portion 582 side of the support portion 22 is open. It is possible to insert and remove a weight 20 inside the support portion 22 from the opened second side surface portion 582 of the support portion 22.

Since it is possible to provide the weight 20 below the base portion 52, in a case in which the weight 20 is provided, it is possible to further lower the center of gravity of the cell 5. Therefore, it is possible to further reduce the concern of the cell 5 falling over. In particular, for example, in a case in which the robot 1 is driven at a high speed, since the top portion of the cell 5 oscillated more easily, it is preferable to provide the weight 20. Meanwhile, for example, in a case in which the robot 1 is driven at a low speed, since not providing the weight 20 inside the support portion 22 enables the entire weight of the cell 5 to be reduced, the cell 5 becomes easier to move.

The weight 20 may not be attached below the base portion 52 by the support portion 22, for example, the weight 20 may be directly attached to the reverse surface of the base portion 52. The region in which the weight 20 is provided may be a region which is illustrated by a two-dot chain line of FIG. 16B.

Even according to the third embodiment, it is possible to achieve the same effect as in the first embodiment.

Fourth Embodiment

Figure 17:
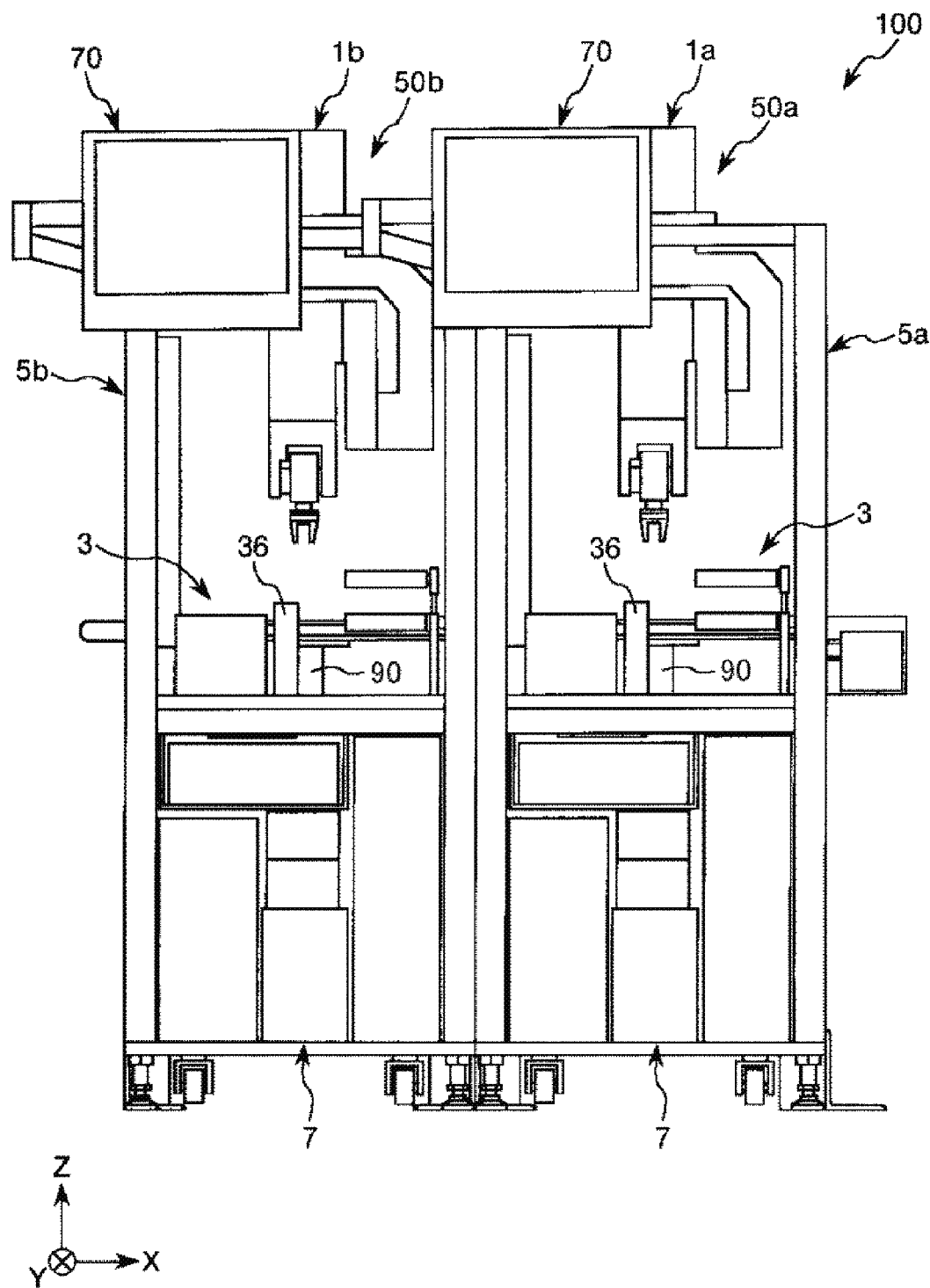
FIG. 17 is a diagram illustrating a fourth embodiment of a robot system according to the invention.
Figure 19A:
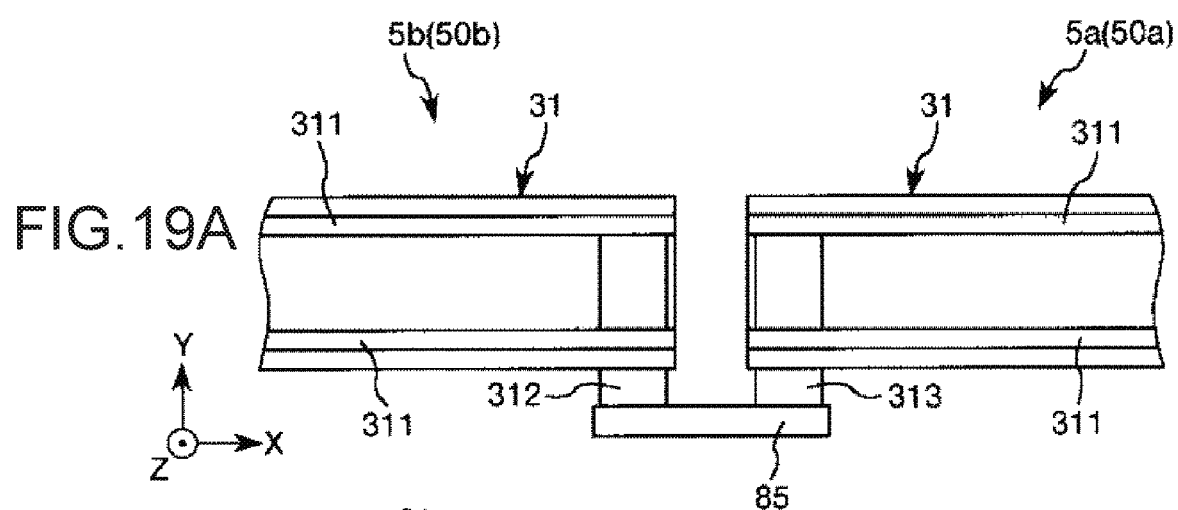
FIGS. 19A and 19B are diagrams for describing a connection of two first transporters which are included in the robot system illustrated in FIG. 17.
Figure 19B:
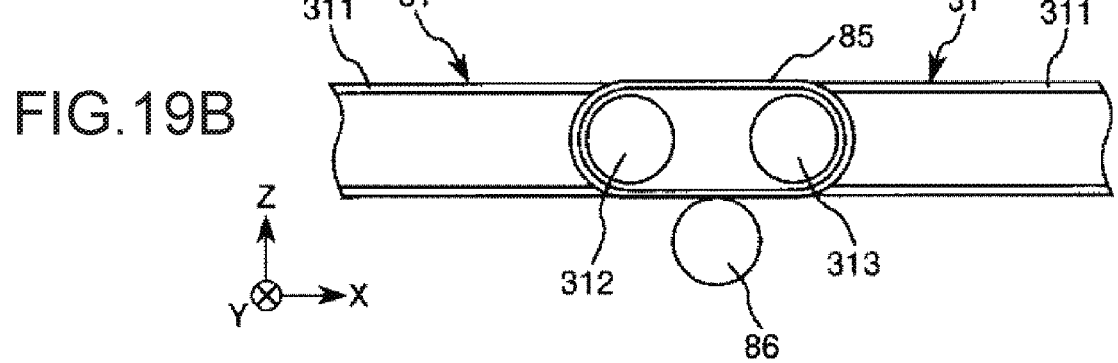

FIG. 17 is a diagram illustrating the fourth embodiment of a robot system according to the invention. FIG. 18 is a diagram illustrating a connecting plate (a connecting portion) which is included in the robot system illustrated in FIG. 17. FIGS. 19A and 19B are diagrams for describing a connection of two first transporters which are included in the robot system illustrated in FIG. 17. FIGS. 20A and 20B are diagrams illustrating another example of a connection of the two first transporters illustrated in FIGS. 19A and 19B. In FIG. 18, the illustration of the gas supply unit is omitted.

Hereinafter, a description will be given of the fourth embodiment with reference to the drawings; however, the description will be given centered on the points of difference with the above-described embodiments, omitting the description of items which are the same.

In the robot system of the present embodiment, the embodiment mainly differs from the first embodiment in that two robot cells are included.

The robot system 100 illustrated in FIG. 17 includes a robot cell 50a and a robot cell 50b. The robot cell 50a includes a robot (a first robot) 1a and a cell (a first cell) 5a in which the robot 1a is provided and which is capable of moving, and the robot cell 50b includes a robot (a second robot) 1b and a cell (a second cell) 5b in which the robot 1b is provided and which is capable of moving. The robot cell 50a has a similar configuration to the robot cell 50 in the first embodiment. The robot cell 50b has a similar configuration to the robot cell 50 in the first embodiment other than not including the drive source. In the same manner as the robot cell 50 in the first embodiment, the robot cells 50a and 50b are each provided with the transport unit 3, the positioning unit 90, the imaging unit 36, the control unit 7, the display operation unit 70, and the gas supply unit 60.

As illustrated in FIG. 18, the cell 5a and the cell 5b are connected by a connecting plate (a connecting portion) 83. The connecting plate 83 connects the top surface of the ceiling portion 53 of the cell 5a and the top surface of the ceiling portion 53 of the cell 5b. The attachment method of the connecting plate 83 to the cells 5a and 5b is not particularly limited, and, for example, it is possible to adopt an attachment method or the like which uses a plurality of bolts.

Here, when each of the robot cells 50a and 50b is installed independently, the top portion of the cell 5a and the top portion of the cell 5b oscillate easily. Therefore, as described earlier, by connecting the cell 5a and the cell 5b using the connecting plate 83, the cell 5a and the cell 5b are integrated. Accordingly, the total installation area of the cell 5a and the cell 5b, that is, the area of the cell 5a and the cell 5a in plan view increases. Therefore, it is possible to reduce the total installation area with respect to the heights of the cell 5a and the cell 5b (the length in the Z-axis direction) (the aspect ratio). Therefore, since it is possible to more stably install the cell 5a and the cell 5b, it is possible to more stably drive the robot 1a and the robot 1b.

As illustrated in FIGS. 19A and 19B, the roller 313 which is included in the first transporter 31 of the cell 5a and the roller 312 which is included in the first transporter 31 of the cell 5b are connected via the connecting belt (the connecting mechanism) 85. Accordingly, the two first transporters 31 are connected. A tension pulley 86 is crimped to the connecting belt 85.

The cell 5b is not provided with a drive source, and the first transporter 31 of the cell 5b is driven by the drive source 351 which is provided in the cell 5a via the connecting belt 85. The cell 5b is provided with the motive power transmission mechanism 352 (refer to FIG. 1) in the same manner as in the first embodiment, and the motive force which is transmitted to the first transporter 31 is transmitted to the second transporter 32 and the third transporter 33 by the motive power transmission mechanism 352. Therefore, the second transporter 32 and the third transporter 33 which are provided in the cell 5b are driven by the drive source 351 which is provided in the cell 5a.

In this manner, the connecting belt 85 functions as a motive power transmission unit which transmits the motive force of the drive source 351 which is provided in the cell 5a to the transporters 31, 32, and 33 of the cell 5b. Therefore, even if the cell 5b does not include a drive source, it is possible to drive the transporters 31, 32, and 33 which are provided in the cell 5b, and thus, it is possible to reduce the number of the drive sources in the robot system 100 overall. Therefore, it is possible to further reduce the overall size of the robot system 100.

In the present embodiment, as illustrated in FIGS. 19A and 19B, the first transporters 31 are connected via the connecting belt 85; however, for example, the two first transporters 31 may be connected by a connecting mechanism 87 which is illustrated in FIGS. 20A and 20B. As illustrated in FIGS. 20A and 20B, the connecting mechanism 87 includes a gear 871 which is attached to the roller 313 which is included in the first transporter 31 of the cell 5a, a gear 872 which is attached to the roller 312 which is included in the first transporter 31 of the cell 5b, and a gear 873 which meshes with the two gears 871 and 872. The two first transporters 31 are connected by the connecting mechanism 87. The connecting mechanism 87 also functions as a motive power transmission unit which transmits the motive force of the drive source 351 which is provided in the cell 5*a* to the transporters 31, 32, and 33 of the cell 5*b*.

Due to the two first transporters 31 being connected, for example, it is possible to transport components from the cell 5*a* to the cell 5*b*. Conversely, it is also possible to transport components from the cell 5*b* to the cell 5*a*. In this manner, since it is possible to transport the components using the first transporters 31, the robot 1*a* and the robot 1*b* are each capable of performing other work during the transporting. Therefore, it is possible to shorten the tact time.

The robot 1*a* operates within the cell 5*a* and the robot 1*b* operates within the cell 5*b*. Here, for example, when the robot 1*a* is capable of moving inside the cell 5*b*, it is necessary to stop the robot 1*a* and the robot 1*b* when a problem arises in the cell 5*b* and maintenance is performed. In contrast, since it is possible for the robot 1*a* to operate within the cell 5*a* and the robot 1*b* to operate within the cell 5*b*, it is possible to perform maintenance in the cell 5*b* without stopping the driving of the robot 1*a*. Therefore, it is possible to reduce the production capability of the entirety of the robot system 100.

In the present embodiment, as described earlier, the robot 1*a* operates within the cell 5*a*; however, the distal end of the robot arm 10 may be caused to move to the outer portion of the cell 5*a*. Accordingly, for example, by moving the distal end of the robot arm 10 into the cell 5*b*, the robot 1*a* is capable of transporting a component into the cell 5*b* using the hand 91. In this manner, since the robot 1*a* is capable of moving the distal end of the robot arm 10 to the outer portion of the cell 5*a*, the working range of the robot 1*a* is widened and it is possible for the robot 1*a* to perform more work. In the same manner, the robot 1*b* may move the distal end of the robot arm 10 to the outer portion of the cell 5*b* and transport a component into the cell 5*a* using the hand 91.

Although not illustrated, by providing a work table to be adjacent to the cell 5*a*, the robot 1*a* is capable of holding and transporting a component on the work table into the cell 5*a*. The same applied to the robot 1*b*. In this manner, in a case in which the working ranges of the robots 1*a* and 1*b* are to be widened, work tables or the like may be provided to be adjacent to the cells 5*a* and 5*b*.

In the present embodiment, the cell 5*a* and the cell 5*b* are in contact with each other; however, the cells may be connected in a separated state without being in contact. In this case, for example, a work table (not illustrated) may be provided between the cell 5*a* and the cell 5*b*.

In the present embodiment, the robot cell 50*b* does not include a drive source; however, the robot cell 50*b* may include a drive source. Even in this case, a configuration may be adopted in which the two first transporters 31 are connected and the transporters 31, 32, and 33 inside the cells 5*a* and 5*b* are driven by the drive source 351 which is provided in the cell 5*a*. In this manner, even if the robot cell 50*b* includes a drive source, due to the two first transporters 31 being connected, it is possible to increase an oscillation suppressing effect by the connection.

Even according to the fourth embodiment, it is possible to achieve the same effect as in the first embodiment.

Hereinabove, a description is given of the robot system and the robot according to the invention based on the embodiments of the drawings; however, the invention is not limited thereto and the configuration of each part may be changed to an arbitrary configuration having the same function. Other arbitrary constituent parts may be added. The invention may be a combination of greater than or equal to two arbitrary configurations (characteristics) of the embodiments.

In the embodiments, the number of rotational movement axes of the robot arm which is included in the robot is six; however, the invention is not limited thereto and the number of rotational movement axes of the robot arm may be, for example, two, three, four, five, or greater than or equal to seven. In the embodiments, the number of arms which are included in the robot is six; however, the invention is not limited thereto and the number of arms which are included in the robot arm may be, for example, two, three, four, five, or greater than or equal to seven.

In the embodiments, the number of robot arms which are included in the robot is one; however, the invention is not limited thereto and the number of robot arms which are included in the robot may be, for example, greater than or equal to two. In other words, the robot may be a multi-armed robot such as a dual-armed robot, for example.

In the embodiments, a description is given of an embodiment in which a single robot is included inside a single cell; however, the number of the robots which are disposed inside the single cell is not limited thereto and there may be greater than or equal to two robots.

In the embodiments, a ceiling surface which is the top surface of an upper frame is exemplified as an attachment surface which is the location at which the base of the robot is fixed; however, the attachment surface is not limited thereto. For example, the attachment surface may be the bottom surface of the upper frame, the frame body, the column portion, the work surface, or the like.

In the embodiments, the cell includes feet; however, the cell may not include feet. In this case, the bottom plate which is positioned at the bottom end of the work table may be directly installed in the installation space.

In the embodiments, the component (the target object) is transported to the positioning unit using the first transporter; however, for example, the robot may transport the component (the target object) to the positioning unit.

In the embodiments, regarding the conditions (the relationship) of the nth rotational movement axis, the nth arm, the (n+1)th rotational movement axis, and the (n+1)th arm, a description is given of a case in which n is 1, that is, a description is given of a case in which the conditions are satisfied in the first rotational movement axis, the first arm, the second rotational movement axis, and the second arm; however, the invention is not limited thereto, and n is an integer which is greater than or equal to 1, and a configuration in which n is an integer greater than or equal to 1 is satisfactory as long as the same conditions are satisfied as in the case in which n is 1. Therefore, for example, the same conditions may be satisfied as in the case in which n is 1 in a case in which n is 2, that is, in the second rotational movement axis, the second arm, the third rotational movement axis, and the third arm, the same conditions may be satisfied as in the case in which n is 1 in a case in which n is 3, that is, in the third rotational movement axis, the third arm, the fourth rotational movement axis, and the fourth arm, the same conditions may be satisfied as in the case in which n is 1 in a case in which n is 4, that is, in the fourth rotational movement axis, the fourth arm, the fifth rotational movement axis, and the fifth arm, and the same conditions may be satisfied as in the case in which n is 1 in a case in which n is 5, that is, in the fifth rotational movement axis, the fifth arm, the sixth rotational movement axis, and the sixth arm.

In the embodiments, a description is given using a vertical multi-jointed robot as an example; however, the robot which is included in the robot system is not limited thereto, and, for example, may be a robot (a first robot) of any configuration such as a horizontal multi-jointed robot. Examples of a horizontal multi-jointed robot include a configuration which includes a base, a first arm (an nth arm) which is connected to the base and extends in the horizontal direction, and a second arm (a (n+1)th arm) which is connected to the first arm and includes a portion extending in the horizontal direction. Since the horizontal multi-jointed robot is small, this is preferable since it is possible to render the region in which the robot is disposed smaller.

In the embodiments, the first transporter (the transporter) 31, the second transporter (the transporter) 32, and the third transporter (the transporter) 33 are each configured by a belt conveyor including two rollers and two belts; however, the configuration of each of the transporters is not limited thereto. For example, the number of belts may be one and may be greater than or equal to three. For example, a single axis module may be adopted.

In the embodiments, a configuration in which a pin is provided as an example of the positioning unit is given; however, the configuration of the positioning unit is not limited thereto. For example, the positioning unit may be configured to be provided with a zipper mechanism and to grip a jig, a component, or the like from both sides using the zipper mechanism, or the like.

The entire disclosures of Japanese Patent Application Nos. 2015-091215, filed Apr. 28, 2015, 2015-091216, filed Apr. 28, 2015 and 2015-091217, filed Apr. 28, 2015 are expressly incorporated by reference herein.

The invention claimed is:

1. A robot system comprising:
   a first robot;
   a first cell housing the first robot;
   a first conveyor transporting a target object in the first cell, the first conveyor including a first belt and a second belt, the first belt extending parallel to and spaced apart from the second belt;
   a jig configured to support the target object on the first conveyor; and
   a stationary positioner being provided in an inner portion of the first cell and positioning the target object relative to the first robot, the stationary positioner being disposed between the first belt and the second belt, the stationary positioner including a pair of retractable pins that engage a pair of apertures in the jig to position the target object, the pair of retractable pins being configured to extend through a plane on a top surface of the first belt and the second belt to engage the pair of apertures in the jig.

2. The robot system according to claim 1, further comprising:
   a second conveyor which transports the target object, wherein the second conveyor has a transport direction in which the target object is transported, the transport direction of the second conveyor being different from a transport direction of the first conveyor.

3. The robot system according to claim 2, further comprising:
   a driver which drives the first conveyor and the second conveyor.

4. The robot system according to claim 2, wherein the first conveyor and the second conveyor each include a portion which is installed in the inner portion of the first cell.

5. The robot system according to claim 2, further comprising:
   a third conveyor which transports the target object, wherein the third conveyor has a transport direction in which the target object is transported, the transport direction of the third conveyor being different from the transport direction of the second conveyor.

6. The robot system according to claim 5, wherein the first conveyor, the second conveyor, and the third conveyor each include a portion which is installed in the inner portion of the first cell, wherein an installation height of the third conveyor inside the first cell is higher than an installation height of the second conveyor, and wherein the installation height of the second conveyor inside the first cell is higher than an installation height of the first conveyor.

7. The robot system according to claim 1, further comprising:
   a second robot which mounts the target object on the first conveyor; and
   a second cell which is provided with the second robot, wherein the first robot operates inside the first cell, and wherein the second robot operates inside the second cell.

8. The robot system according to claim 1, wherein the first robot includes
   an nth arm which is configured to rotationally move around an nth (where n is an integer greater than or equal to 1) rotational movement axis, and
   an (n+1)th arm which is provided in the nth arm, the (n+1)th arm being configured to rotationally move around an (n+1)th rotational movement axis which has an axial direction different from an axial direction of the nth rotational movement axis.

9. The robot system according to claim 8, wherein a length of the nth arm is longer than a length of the (n+1)th arm, and wherein the (n+1)th arm is configured to completely overlap the nth arm when viewed from the axial direction of the (n+1)th rotational movement axis.

10. The robot system according to claim 8, wherein the first robot is provided with a base which is provided in the first cell, and wherein the nth arm is provided on the base.

11. The robot system according to claim 10, wherein in the first robot, a connecting portion between the base and the nth arm is provided to be positioned vertically above a connecting portion between the nth arm and the (n+1)th arm.

12. The robot system according to claim 10, wherein the first cell includes a ceiling portion, and wherein the base is provided on the ceiling portion.

13. The robot system according to claim 1, wherein the first robot includes
   a base which is provided in the first cell,
   an nth arm which is provided on the base and is configured to rotationally move around an nth (where n is an integer greater than or equal to 1) rotational movement axis, and
   an (n+1)th arm which is configured to rotationally move around an (n+1)th rotational movement axis which has an axial direction which is parallel to an axial direction of the nth rotational movement axis.

14. The robot system according to claim 1, further comprising:
   a height adjuster which is configured to change an installation height of the first robot with respect to the first cell.

15. The robot system according to claim 14,
wherein the first robot includes a base which is attached to the first cell and an nth (where n is 1) arm which is connected to the base, and
wherein the height adjuster includes a spacer which changes a separation distance between the base and the first cell.

16. The robot system according to claim 1,
wherein a gas supply which supplies a clean gas is provided in the first cell.

17. The robot system according to claim 16,
wherein the gas flows vertically down from the gas supply.

18. The robot system according to claim 16,
wherein the gas supply includes a filter.

19. A robot which is provided in a cell,
wherein a stationary positioner which positions a target object on a first conveyor is present in an inner portion of the cell, the first conveyor including a first belt and a second belt, the first belt extending parallel to and spaced from the second belt, and the stationary positioner being disposed between the first belt and the second belt, the robot performs work with respect to the target object which is positioned by the stationary positioner, a jig is configured to support the target object on the first conveyor, and the stationary positioner includes a pair of retractable pins that engage a pair of apertures in the jig to position the target object, the pair of retractable pins being configured to extend through a plane on a top surface of the first belt and the second belt to engage the pair of apertures in the jig.

* * * * *